(12) United States Patent
Taleyarkhan et al.

(10) Patent No.: US 10,393,894 B2
(45) Date of Patent: Aug. 27, 2019

(54) FAST NEURON SPECTROSCOPY WITH TENSIONED METASTABLE FLUID DETECTORS

(71) Applicant: Purdue Research Foundation, West Lafayette, IN (US)

(72) Inventors: Rusi Pesi Taleyarkhan, West Lafayette, IN (US); Thomas Francis Grimes, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/226,749

(22) Filed: Dec. 20, 2018

(65) Prior Publication Data
US 2019/0146104 A1    May 16, 2019

Related U.S. Application Data

(63) Continuation of application No. 15/713,919, filed on Sep. 25, 2017, now abandoned.

(60) Provisional application No. 62/398,572, filed on Sep. 23, 2016.

(51) Int. Cl.
    *G01T 3/00* (2006.01)
    *G01T 5/06* (2006.01)

(52) U.S. Cl.
    CPC ............. *G01T 3/00* (2013.01); *G01T 3/001* (2013.01); *G01T 5/06* (2013.01)

(58) Field of Classification Search
    CPC .. G01T 3/00; G01T 5/00; G01T 3/001; G01T 5/06; G01N 1/00; G01N 23/00
    USPC ..................................................... 250/390.04
    See application file for complete search history.

(56) References Cited

U.S. PATENT DOCUMENTS

2009/0296871 A1* 12/2009 Taleyarkhan ........... G01T 1/167
                                                                         376/153

* cited by examiner

*Primary Examiner* — David P Porta
*Assistant Examiner* — Meenakshi S Sahu
(74) *Attorney, Agent, or Firm* — Purdue Research Foundation; Zhigang Rao

(57) ABSTRACT

Systems and methods for neutron detection using tensioned metastable fluid detectors, using a single atom spectroscopy approach.

6 Claims, 19 Drawing Sheets

CDE – Cavitation detection event from recoil of dominant atom when struck by neutron
Ec – Energy of C atom nucleus
Eth – Threshold C energy to cause cavitation detection event in TMFD
[EV] – Nx1 vector of expt. derived neutron detection rate at various Pneg states
L* – Location at which unknown source must be placed for spectrometry
(Note: L* should be set at the face of the TMFD bulb for field applications involving use of TMFDs for fast neutron dose monitoring from an arbitrary neutron energy spectrum)
M – Number of energy bins (~10-15) for approximating the neutron source spectrum
N – Number (~8-10) of Pneg states at which neutron induced CDE data are to be acquired
[NE] – Mx1 vector of neutron energy spectrum broken into M bins
Pneg – Negative (tensioned) pressure in TMFD fluid in central bulb
[RM] – MxN response matrix
SAS – Single Atom Spectroscopy
TMFD – Tensioned Metastable Fluid Detector

FIG.17C

FAST NEURON SPECTROSCOPY WITH TENSIONED METASTABLE FLUID DETECTORS

The present application claims the benefit of the filing date of U.S. provisional application Ser. No. 62/398,572, filed 23 Sep. 2016, the contents of which are incorporated herein by reference.

GOVERNMENT SUPPORT CLAUSE

This invention was made with government support under DGE-0833366 and DGE-1333468 awarded by the National Science Foundation. The government has certain rights in the invention.

TECHNICAL FIELD

The present application relates to systems and methods for neutron detection, and in particular to methods for neutron detection associated with tensioned metastable fluid detectors.

BACKGROUND

This section introduces aspects that may help facilitate a better understanding of the disclosure. Accordingly, these statements are to be read in this light and are not to be understood as admissions about what is or is not prior art.

The ability to perform neutron spectroscopy offers significant benefits especially when using tensioned metastable fluid detectors (TMFDs) which offer unique advantages relative to state of art systems.

It is well-known that neutron detection with spectroscopy is of significant importance in a wide range of fields ranging from fundamental physics to nuclear power to combatting nuclear terrorism. Tension Metastable Fluid Detector (TMFD) technology offers a unique alternative to conventional neutron detectors for a wide array of applications. Highlights of TMFD capabilities include but are not limited to: high intrinsic efficiency for both fast and thermal neutrons, on-off times on the order of microseconds to allow phase locking with pulsed interrogation sources for active interrogation, gamma blindness to vastly decrease nuisance (interfering) background and allow active photon interrogation, single system directionality capabilities, the ability to extend to alpha and fission product detection, promising capability to perform neuron multiplicity assessments, the ability to change sensitivity on demand, and potentially with significant reduced cost and complexity of operation when compared to the state of the art.

Despite strong performance as a detector, usefulness of TMFDs in dose measurements or spectrometry requires knowledge of the response function to relate the tension state of the detector with the amount of energy deposited (by incoming radiation over nanometer scales) to the propensity to generate a Cavitation Detection Event (CDE). This constituted a key piece of information which, until now has remained intractable to assess with any reasonable level of accuracy. The mainstay elegantly simple so-called Thermal Spike Theory (TST) which robustly predicts CDEs for thermally superheated metastable fluids for bubble chambers fails, when applied to tensioned (room temperature) metastable fluids to describe the manifestation of CDEs. As vividly seen from Table 1, TST predicts energy barriers to nucleation of cavities in tensioned metastable state fluids that are more than an order of magnitude smaller than the barrier encountered experimentally.

TABLE 1

Predicted (thermal-spike-theory) and actual TMFD experimental energy barrier for detecting $^{210}$Po alpha recoils in acetone (at 20° C. and $P_{neg}$ = −8.3 bar).

| Energy Barrier Components | Energy (keV) |
| --- | --- |
| Surface (Tension) energy | 5.7 |
| Expansion work (pdV) | 3.9 |
| Evaporation energy | 2 |
| Kinetic energy given to liquid | 0 |
| Viscous energy loss | 2.1 |
| Total predicted energy barrier | 13.7 |
| Actual ion recoil energy [3] | 101 |

As a result, applying TST to predict outcomes from TMFD experiments results in far more predicted CDEs than actually observed experimentally. Without the ability to model detector response for CDEs with reasonable accuracy for neutrons of different energies, it therefore, has remained unrealized to develop response matrices and to distinguish a large flux of particles with a small interaction cross-section from a small flux of particles with a large cross-section. While response curves for any arbitrary neutron source in a given source-detector geometry can be obtained experimentally and used to estimate the intrinsic TMFD detection efficiency, the spectral identification of an arbitrary neutron source in an arbitrary geometry requires rigorous knowledge of the TMFD's response function.

There is, therefore an unmet need for a novel approach to identify a response function to relate the tension state of the detector with the amount of energy deposited (by incoming radiation over nanometer scales) to the propensity to generate a CDE.

BRIEF DESCRIPTION OF DRAWINGS

FIGS. 17A, 17B and 17C show a flowchart outlining operations embodied in the present disclosure.

DETAILED DESCRIPTION

Figure 1:
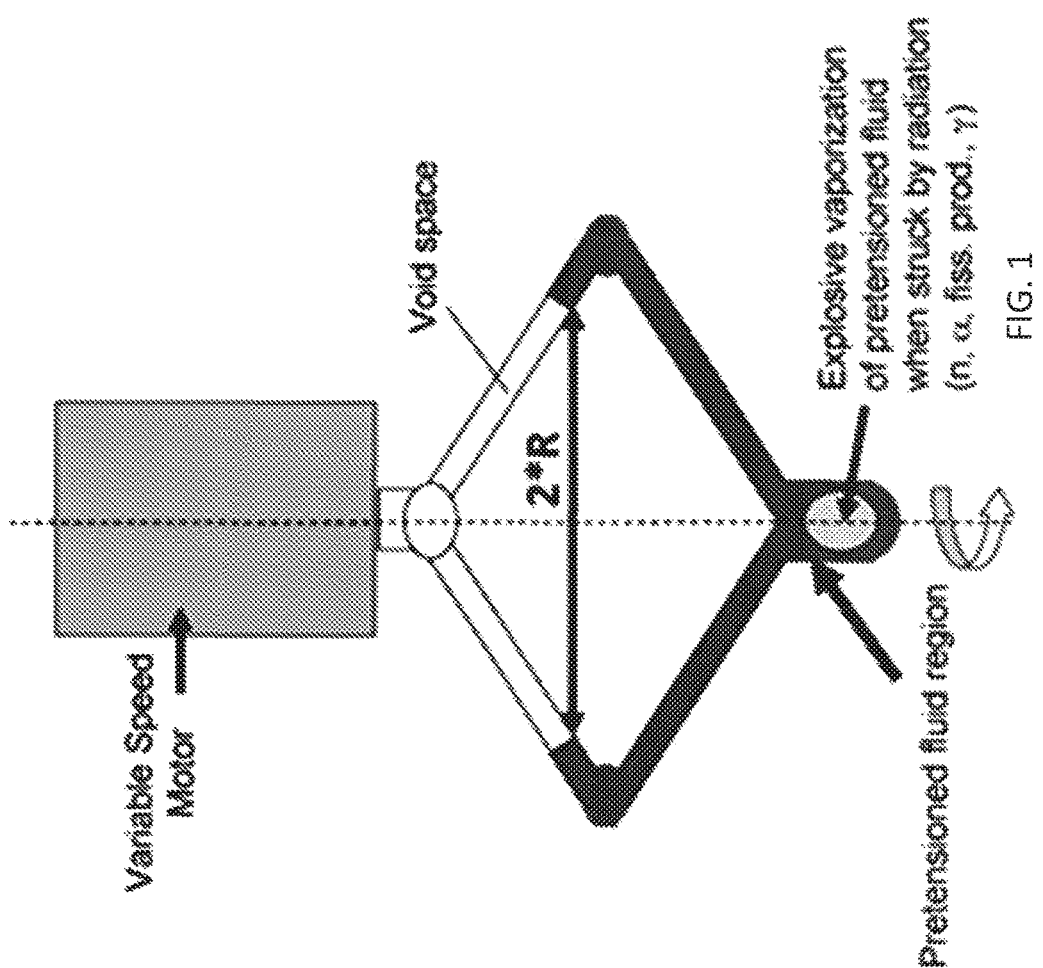
FIG. 1 is a schematic representation of a Centrifugally Tensioned Metastable Fluid Detector (CTMFD) sensor system according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel approach to identify a response function to relate the tension state of the detector with the amount of energy deposited (by incoming radiation over nanometer scales) to the propensity to generate a Cavitation Detection Event (CDE) is disclosed. To enable the generation of this function for tensioned metastable fluid detectors (TMFDs), Single Atom Spectroscopy (SAS) was developed and constitutes one embodiment of the subject matter of this disclosure.

The inability of prevailing theoretical models (developed successfully for a classical bubble chamber) to adequately predict detection thresholds for tensioned metastable fluid conditions is presented herein. To that end, techniques are presented to overcome these inherent shortcomings, leading thereafter, to allow successful neutron spectroscopy using TMFDs—via a newly developed Single Atom Spectroscopy (SAS) approach. SAS also allows for a unique means for rapidly determining neutron energy thresholds with TMFDs. This is accomplished by simplifying the problem of determining Cavitation Detection Events (CDEs) arising from neutron interactions with one in which several recoiling atom species contribute to CDEs, to one in which only one dominant recoil atom need be considered. One exemplary fluid is Heptane ($C_7H_{16}$) for which only recoiling C atoms contribute to CDEs. Using the SAS approach, the threshold curve for Heptane is derived using isotope neutron source data, and then validated against experiments with monoenergetic (2.45/14 MeV) neutrons from D-D and D-T accelerators. Thereafter the threshold curves are utilized to produce the response matrix for various geometries. The response matrices are in turn combined with experimental data to recover the continuous spectra of fission (Cf-252) and ($\alpha$,n) Pu—Be isotopic neutron sources via an unfolding algorithm. A generalized method is also presented for performing neutron spectroscopy using any other TMFD fluid that meets the SAS approach assumptions.

TMFDs operate in a manner analogous to causing a tear in a stretched rubber band. The more one stretches the molecules, the easier it becomes to cause a tear with a given stimulus that provides the excess energy to break apart the bonds holding the rubber together (e.g., poking with a needle). In TMFDs the fluid space is stretched such that particles like neutrons or other radioactive recoiling nuclei can then provide the required excess energy to cause a cavitation detection event (CDE). A tensioned metastable fluid becomes selectively sensitive to ion recoils induced by neutron interactions when the fluid of the TMFD is tensioned such that it attains a sub-atmospheric or even sub-zero (below perfect vacuum) pressure fluid state. As an incident neutron enters the fluid and collides with the nucleus of one of the atoms, the recoiling ionized nucleus then deposits energy through soft and hard interactions with surrounding fluid molecules resulting in a localized thermally superheated cavity in the tens of nanometer range. If the amount of energy deposited is not sufficient to overcome the energy barrier imposed for cavitation bubble growth, the vapor cavity will condense and collapse back into the liquid. If, however, the ion manages to deposit enough energy to overcome the required threshold, the cavity will reach a critical size and continue to grow thereafter, in the negative pressure field. In order for this to happen, an amount of energy exceeding the energy barrier must be deposited within a critical diameter. The critical radius, $r_c$, can be expressed (to the first order) in terms of the surface tension, $\sigma$, the pressure of the vapor inside the cavity, $p_v$, and the pressure of the liquid outside the cavity, $p_l$ as described in equation (1) below.

$$r_c = \frac{2\sigma}{p_v - p_l} \quad (1)$$

In fluid molecules with multiple constituent atoms, each atom in the fluid will need to be given a different amount of energy by impinging radiation (focusing on neutrons) in order to overcome the energy barrier. These energies can vary greatly. The variation is due to a difference in linear energy transfer (LET) over the critical cavity dimension which typically is in the tens of nanometer range (see Table 2 for a TMFD fluid such as acetone with dissolved boron). Because both the critical dimension and the LET are functions of complex fluid properties, it is highly desirable to find candidate fluids that possess only a single "dominant" atom. In this way, all recoil atoms generated by nuclear interactions can be deemed to deposit energy in the same manner and the only difference that needs to be considered is the starting energy.

TABLE 2

| Linear energy transfer of 1 MeV particles of varied mass calculated via SRIM in a sample fluid [5]. | |
|---|---|
| Ion at 1 MeV | dE/dx (MeV/cm) |
| e (electron) | 1 |
| Hydrogen (Z = 1) | 183 |
| Boron (Z = 5) | 3768 |
| Carbon (Z = 6) | 4217 |
| Oxygen (Z = 8) | 4455 |

Even if all the recoils of interest deposit their energy similarly, in a practical system the detection of these recoils could be different due to a difference in the encountered negative pressure of the fluid at the location of the strike. By adding an assumption that the negative pressure field is uniform, it may then be said that all recoils born with energy less than the energy that corresponds to the Bragg peak will have a greater propensity to nucleate and result in a CDE, than ions born with lesser energy. Given these stipulations, the CDE threshold can now be determined by simulating ion recoils, sorting all recoils generated in the TMFD sensitive region by energy, and then finding the specific energy threshold wherein the number of recoils generated at or above that energy corresponds to the experimentally obtained detection rate.

Referring to FIG. 1, a schematic representation of a Centrifugally Tensioned Metastable Fluid Detector (CTMFD) sensor system according to the present disclosure is presented. CTMFDs as configured induce tension in a specific sensitive volume by spinning rapidly around the central axis. Further description of FIG. 1 is provided in U.S. Pat. No. 9,194,966 to Taleyarkhan et al., incorporated by reference in its entirety into the present disclosure. The liquid in the arms is drawn away from the axis of rotation towards the elbow of the device. The tensile force in the fluid arm below the elbow is balanced by the compressive force in the fluid molecules from above the elbow. This architecture results in a tension pressure variation in the lower arms about the central bulb generating the maximum tension pressure ($P_{neg}$) state in the fluid volume at the central axis within the bulb at the bottom. The $P_{neg}(r)$ magnitude can be predicted by a straightforward application of the Bernoulli equation for incompressible fluids as evidenced from Eqs. (2) and (3), provided below. As the rotational speed increases, for a given combination of fluid density and meniscus separation, the tension pressure within the CTMFDs sensitive cavity is lowered—to the point of overcoming the normal ambient 0.1 MPa (1 bar) pressure, and thereafter, to negative pressure states (i.e., to below vacuum pressures). The induction of sub-zero pressures in the fluid now enables incoming ionizing particles like neutrons to deposit energy onto atoms of the fluid molecules. As explained earlier, this results in recoiling ions which deposit energy which (if sufficient), to then cause localized cavitation and bubbles to form that grow to visible-audible states and can be recorded.

Once a desired $P_{neg}$ state is achieved a clock is initiated for detecting incoming neutrons that can cause CDEs. These events result in a fast growing bubble which expands within microseconds to form a vapor column in the interior of the CTMFD's sensitive bulb region. Around the central bulb are positioned infrared (IR) beam sensors which then detect the difference in light transmission upon bubble formation, and the radiation induced CDE is thus recorded and timed. The CTMFD is nominally operated with use of LABVIEW based virtual instrument (VI) control-data acquisition software, but can be operated manually as well. With this IR sensing system and the control software used for the experiments presented in this specification, CDE's occurring about 0.3 s or more (i.e., the wait time; which translates to rate of detection of about 3 $s^{-1}$ and lower) after reaching the desired $P_{neg}$ were possible to use reliably. This time is also referred to as the "wait-time" which is the inverse of the traditional rate of detection. From a practical sense, as the source neutron intensity increases, and the time it takes for the CTMFD to detect the neutrons upon reaching the $P_{neg}$ state gets towards 0.3 s, the uncertainty involved in the data rises and hence, conducting SAS for high intensity sources with such a system required that the source-to-detector distance be adjusted accordingly or that, the $P_{neg}$ states be tailored such that the wait time is sufficiently above 0.3 s.

Within the central bulb of a Centrifugally Tensioned Metastable Fluid Detector (CTMFD) shown in FIG. 1, the pressure gradient from the centerline to the edge of the central bulb is obtained by a rearrangement of the classical Bernoulli equation for incompressible fluids.

As such, at the centerline axis, the negative pressure ($P_{neg}$) is expressed as:

$$P_{neg}(r=0) = 2 * \pi^2 * \rho_l * R^2 * f^2 - P_{amb} \qquad (2)$$

The $P_{neg}$, (r), at a location away from the centerline is:

$$p_{neg}(r) = \frac{(p_{neg}(0) + P_{amb})(R-r)^2}{R^2} - P_{amb} \qquad (3)$$

The various terms in Eqs. (2) and (3) follow conventional notation in that $P_{neg}(r)$ is the negative pressure at a given radius (r), $\rho_l$ is the density of the liquid, f is the rotational frequency, R is the distance of the meniscus of the liquid above the elbow from the centerline, r is the radius at the location being investigated (r=0 at the centerline), $P_{amb}$ is the ambient pressure. The maximum meniscus separation diameter (2 R) for the baseline CTMFD apparatus used for studies of the present disclosure was about 0.29 m, the sensitive volume bulb (about 2.3 cc) diameter is approximately 15 mm, and the wall thickness is close to 2 mm. Using these values, the induced negative pressure at the inside wall of the sensitive bulb can be calculated. For small centerline $P_{neg}$, (e.g. about −1 bar), there is an approximately 15% difference between the $P_{neg}$ at the centerline of the sensitive region and in the fluid at the wall of the sensitive region. However, as the centerline $P_{neg}$ increases to about −10 bar the difference reduces to about 8%. As is obvious, such reductions depend on the choice of sensitive volume bulb's radius, r, relative to the meniscus radius R.

While, identifying TMFD fluids with only a single constituent atom for conducting experiments at room temperature is impractical, hydrocarbons offer a practical alternative, in that, at least for TMFD based neutron spectroscopy, they could be selected to "effectively" possess properties very similar to an ideal monoatomic fluid. This is related to LET (dE/dx) for recoiling atoms. From Table 2 we see that the LET for H atom recoils is relatively small (183 MeV/cm) despite the fact that neutrons will deposit more energy in collisions with H than with any other atom. Carbon (C), on the other hand, with 6 units of charge delivers a significantly higher LET (about 4200 MeV/cm). As a result, for virtually all TMFD fluid choices, in relevant fast neutron detection conditions H recoils may be ignored (i.e., up until the nucleation $P_{neg}$ threshold becomes small enough wherein, even proton recoils offer the CDE enablement). Additionally, as Table 2 data indicate, background gamma-electron LET contributions would be ×100 lower and also safely ignored.

Figure 2:
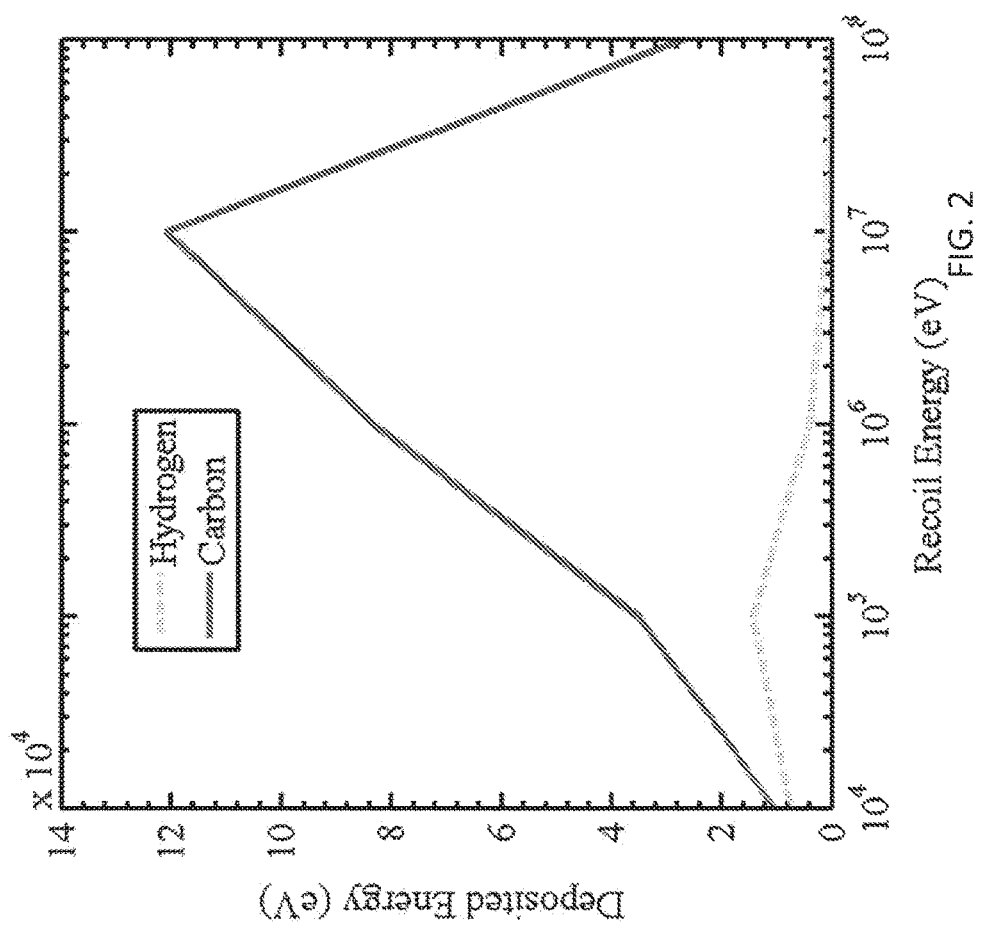
FIG. 2 shows relative energy deposition by carbon and hydrogen in 1825 Angstrom critical bubble diameter in Heptane as modeled in SRIM.

Notably, a 14 MeV neutron strike can create C ion recoils with up to about 4 MeV from frontal interaction; and H recoils will be generated up to about 14 MeV under such conditions. With a 2.5 MeV neutron (e.g., D-D) source, C ion recoils will be created up to 0.7 MeV and H recoils will be created up to about 2.5 MeV. Referring to FIG. 2, relative energy deposition by Carbon and Hydrogen in 1825 Angstrom critical bubble diameter (corresponding to −4.4 bar $P_{neg}$) in Heptane ($C_7H_{16}$) as modeled in SRIM is shown. From FIG. 2 it is seen that within a critical bubble diameter at −4.4 bar of negative pressure in Heptane (an advantageous choice), a Carbon ion on the order of about 1 MeV ion deposits greater than 4 times as much energy into the critical diameter (<about 200 nm), than H recoils at any energy up to and including hundreds of MeV. Thus, despite the greater energy initially imparted to the Hydrogen atoms, the energy deposition for creating a critical sized cavity is dominantly higher for Carbon atoms.

It is also important to note that the technique for determining the threshold by ordering recoil deposition breaks down when the initial recoil energy near the threshold exceeds the energy corresponding to the Bragg peak. Ions born with higher energy than this amount of energy will have a LET less than the LET at the Bragg Peak at the beginning of the track. However, as they slow down in the fluid, there will be a critical diameter over which they each have the opportunity to deposit an identical amount of energy corresponding to the LET at the Bragg Peak (assuming they do not leave the detector). Thus, the fluid would be expected to go from detecting all neutron elastic scatters depositing more than the Bragg peak energy (and the algorithm sets the Bragg peak energy to be the threshold) to not detecting any neutrons at all (and the algorithm is unable to determine a threshold) within a very small window of negative pressure. Fortunately, for isotopic and (D,D) or (D,T) fusion sources carbon recoil energies remain far below the Bragg peak energy of about 10 MeV (for Carbon in Heptane) as noted in FIG. 2.

The calculation of CDE thresholds assumes that there is only a single particle interaction depositing a portion of its energy within the critical bubble radius (in the 10-100 nm range). In extremely high radiation environments, there theoretically could be coincident interactions that can collectively overcome the energy barriers for CDEs, even when individual particles would not; for instance, for CDEs from high intensity nanosecond UV laser pulse (mJ/pulse) induced cavitation. However, this should not pose an issue for neutron detection from most [Special Nuclear Material (SNM) detection related] practical neutron sources emitting about $10^5$ n/s. For an example situation, the total number of interactions each depositing 410 eV within 100 nm in the CTMFD volume in Heptane as predicted by MCNP calculation is about 40/s within the whole 2.3 cm$^3$ cavity. The size of the critical radius is on the order of $10^{-7}$ m at most. Thermal spike theory places a lower bound for the bubble-wall velocity is around 3 m/s and thus the time of expansion or heat dissipation is $10^{-7}/3=3.3*10^{-8}$ s (although the timescale for the energy to fully leave the bulb is significantly longer). The size of the critical cavity is $4/3*\pi*(10^{-7}$ m$)^3=4.2*10^{-15}$ cm$^3$. Thus, the frequency of two neutrons depositing energy in the same critical diameter space in coincidence before the heat dissipates is negligible. Despite photons being emitted by both the $^{252}$Cf and the Pu—Be source in the experiments performed (as well as the IR sensors used to record CDEs), photons are not included in considerations for nucleation; this is because the linear energy transfer is negligible compared to that from neutron interactions. A CTMFD operating in the neutron CDE $P_{neg}$ state regime convincingly cannot produce an event due to single photon interaction as long as the photon energy is not above the photoneutron nuclear reaction threshold.

Many hydrocarbons have the desired property that LET from H recoils is negligible compared to that from C recoils. In order to find an optimal fluid, candidates needed to be assessed on predicted Pu—Be fast neutron source $P_{neg}$ threshold ($P*_{neg}^{Pu-Be}$), and vapor pressure. Table 3 presents pertinent property variables for a range of possible choices of TMFD fluids for SAS.

TABLE 3

Properties for hydrocarbons that were considered for SAS application.

| Fluid | Pvap (mmHg) | Predicted $P_{neg}$ (bar) | Carbon density (g/cc) |
|---|---|---|---|
| Isopentane (C$_5$H$_{12}$) | 595 | 0 | 0.51 |
| Hexane (C$_6$H$_{14}$) | 130 | −4.2 | 0.55 |
| Heptane (C$_7$H$_{16}$) | 40 | −4.4 | 0.57 |
| Octane (C$_8$H$_{18}$) | 11 | −5.4 | 0.59 |
| Nonane (C$_9$H$_{20}$) | 3.2 | −6.8 | 0.61 |
| Dodecane (C$_{12}$H$_{26}$) | 1.5 | −8.7 | 0.64 |

Figure 3:
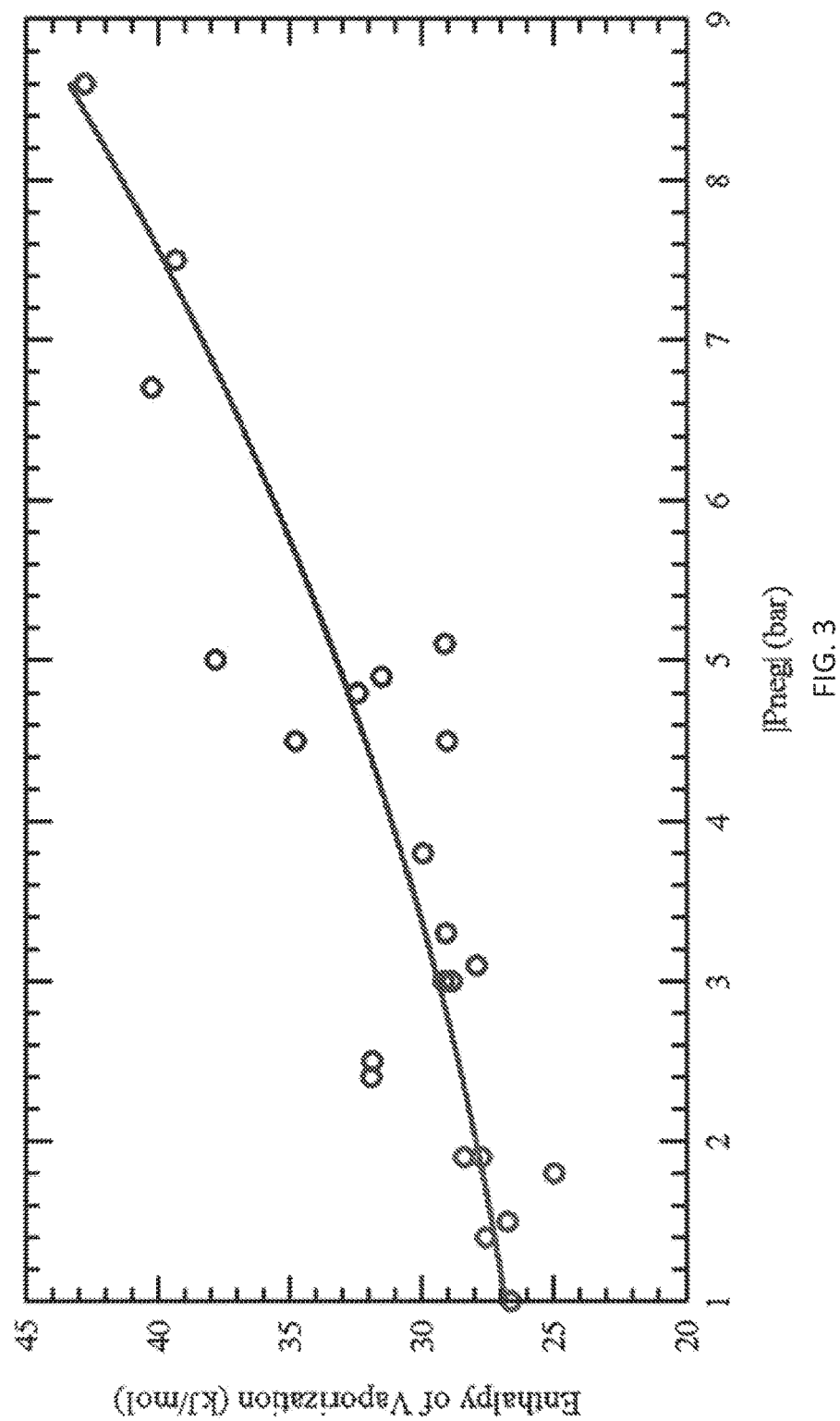
FIG. 3 shows a TMFD detection fluid enthalpy of vaporization versus tension pressure thresholds for detecting fast neutrons from a Pu—Be isotope neutron source.

The $P*_{neg}^{Pu-Be}$ nucleation threshold for a TMFD liquid is defined as the negative pressure ($P_{neg}$) that corresponds to an average time between CDEs of 100 s when a CTMFD similar to the one shown in FIG. 1 was exposed to a Pu—Be neutron source emitting about $2*10^6$ n/s at a distance of 20 cm. A database of 25 experiments with 17 different TMFD fluids was prepared to correlate various fluid properties such as surface tension (s), heat of vaporization ($H_{vap}$), viscosity (m), etc. with the experimental $P_{neg}$ thresholds. It was found that the $P_{neg}$ correlated well with Hvap—something quite unexpected given that predictions using the well-known thermal spike theory (TST) declares this specific work term enabling CDE to be a very small component as seen in Table 1. Referring to FIG. 3, a TMFD detection fluid enthalpy of vaporization vs. tension pressure ($|P_{neg}|$) thresholds for detecting fast neutrons from a Pu—Be isotope neutron source (1Ci Pu—Be source positioned about 20 cm from a about 3 cc CTMFD, average detection time of 100s at a given $P_{neg}$ is shown. The quadratic fit for the data set in FIG. 3 is shown in Eq. (4). The correlation coefficient ($R^2$) is about 0.8.

$$H_{vap}=0.1605*P_{neg}^2+0.6305*P_{neg}+26.036 (R^2=0.79) \quad (4)$$

Using this formulation, it was possible to predict, a priori, the required $P_{neg}$ for various fluids with reasonable accuracy. Acetone at 22° C. was predicted to have a threshold of −4.64 bar and the experimental value was −4.8 bar. Isopentane at −25° C. was predicted to have a threshold of "1.86 bar and the experimental value is found by us to be between −2 and −2.5 bar. The formulation was then used to predict the threshold that would be obtained with other hydrocarbons. Given the testing apparatus and the near uniformity of fluid densities, it was considered optimal to find a fluid with a threshold between −4 and −5 bar. For fluids with thresholds below this $P_{neg}$, the CTMFD went from wholly insensitive to instantaneous detection with very small rotational speeds and hence, not feasible for use for SAS. It is pointed out that the correlation has limitations; it somewhat under-predicts the $P_{neg}$ for fluids with very high and very low $H_{vap}$ values such as for Isopentane (predicted=0 bar, measured=−1.1 bar) and Dodecane (predicted=−8.7 bar, measured=−11 bar); however, it offered acceptable accuracy for the majority of typical TMFD fluids such as Heptane (predicted=−4.4 bar, measured=−4.4 bar).

Figure 4:
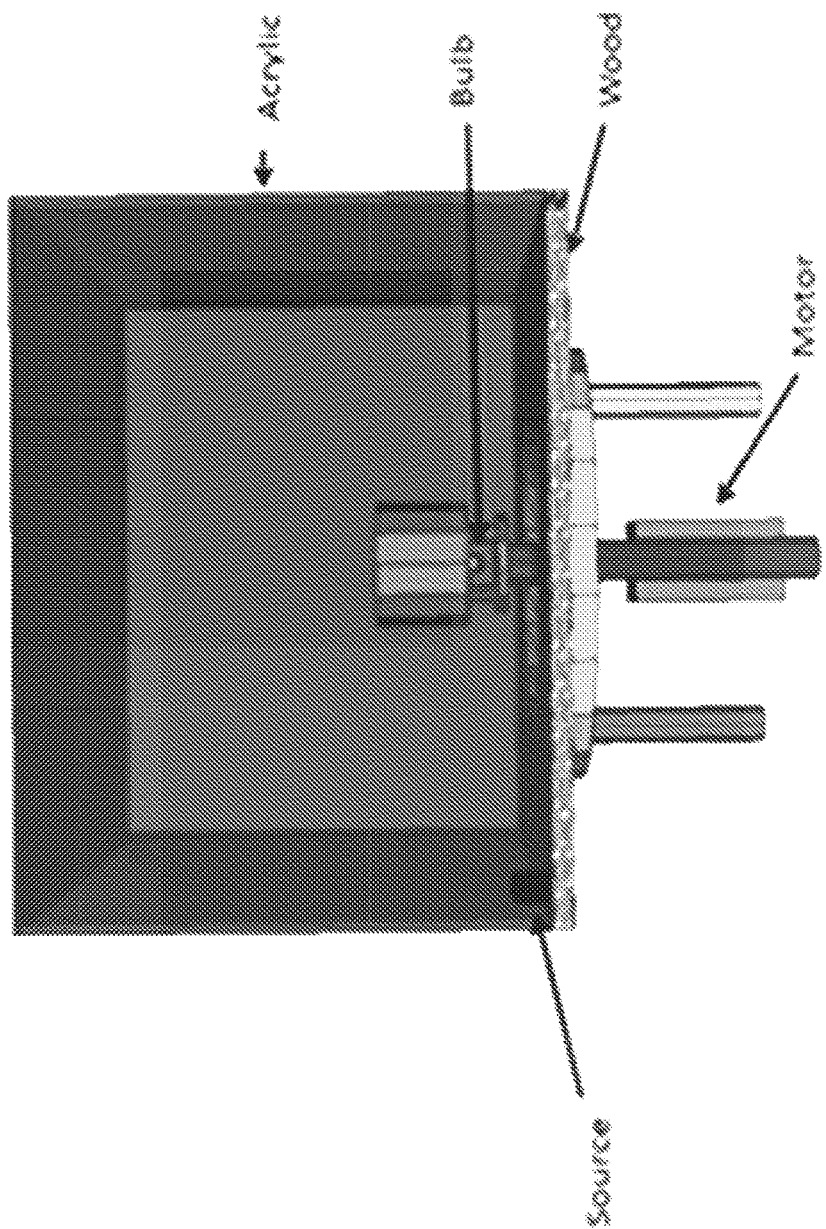
FIG. 4 shows a CTMFD system geometry as modeled for MCNPX-POLIMI code calculations.
Figure 5:
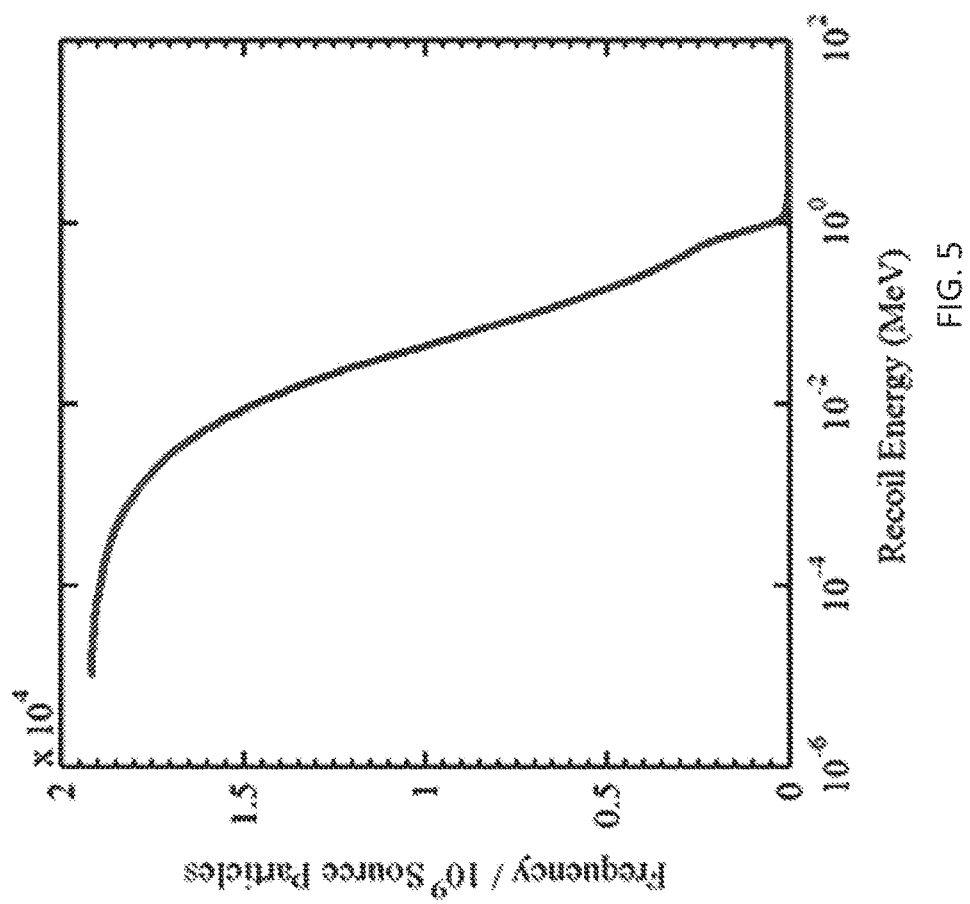
FIG. 5 shows frequency of induced recoils in Heptane versus recoil energy of C atoms when subject to neutrons emitted from a Pu—Be isotope neutron source positioned about 35 cm from the CTMFD bulb.

When generating the data for FIG. 3, some of the fluids were identified as being very difficult to work with because of their high vapor pressure. Isopentane, for instance, with a vapor pressure of 595 mmHg was difficult to keep at a constant 2 R meniscus separation in the CTMFD due to evaporation losses at room temperature, unless a specific sealing cap material is utilized (e.g., viton); otherwise, isopentane tends to chemically attack most materials like ordinary rubber. Acetone with a vapor pressure of 180 mmHg at room temperature has proven to be a reliable standard TMFD detection fluid in the past for fast neutrons without significant evaporation loss. Thus, it was advisable to select a fluid for SAS which not only offered a $P_{neg}$ threshold in the −4 bar range, but also one which possessed vapor pressure at or below 180 mmHg at room temperature and one that did not attack most sealing caps. While not immediately helpful in determining the nucleation threshold of the fluid, a higher density of C atoms for SAS is desirable due to the enhanced probability of scattering induced CDEs for a given neutron flux. Based on the information from Table 3, Heptane was selected for its low vapor pressure, $P_{neg}$ threshold, and sufficiently high density of Carbon atoms. Referring to FIG. 4, a CTMFD system geometry as modeled for MCNPX-POLIMI code calculations is provided. MCNPX-POLIMI, a Monte Carlo neutron simulation tool was used to render and model in 3-D the interaction of neutrons with the testing apparatus configuration (shown in FIG. 4). For each of $10^9$ (billion) neutrons (simulating a Pu—Be isotope neutron source spectrum), the resulting scatter interactions off of the C and H atoms in the bulb were recorded along with the specific XYZ position and the time of flight up to that collision. Referring to FIG. 5, a spectrum showing frequency of induced recoils in Heptane (in the CTMFD sensitive volume) vs recoil energy of C atoms when subject to neutrons emitted from a Pu—Be isotope neutron source positioned about 35 cm from the CTMFD bulb is shown. The collisions with C atoms and resulting interaction energetics information database were then used to create the recoil spectrum is shown in FIG. 5 which provides the number of carbon recoils generated at or above the energy on the x-axis per $10^9$ incident neutrons from a Pu—Be isotope neutron source positioned 35 cm away as depicted in FIG. 4. The count rate frequency begins to stabilize toward the eV range because the lower energy Pu—Be neutrons tend to leak away (i.e., escape the detector volume) before they thermalize in the absence of significant moderation in this particular system configuration.

Control experiments were performed to establish that the TMFD was ready for detection with negligibly low false positives. In none out of the ten, one minute trials at a $P_{neg}$ of −8 bar resulted in CDEs in the absence of the Pu—Be or Cf-252 neutron source. The Pu—Be source (emitting about $2.4*10^6$ n/s) was then brought in and placed at a distance about 35 cm from the CTMFD for gathering data at various $P_{neg}$ states. For these runs, the time between CDEs ("wait time") is defined as the time it takes for a CDE to occur after the CTMFD is ramped up in speed, and the targeted $P_{neg}$ state is achieved (a process requiring about 5 s from a cold start). Data were acquired for $P_{neg}$ states between −4.4 bar and −6.0 bar in 0.2 bar increments. Results are summarized in Table 4—the Error column includes both Poisson error from the radiative process as well as systematic error induced by the LABVIEW equipment for 3 s cycle time.

$$\text{Poisson Error} = \frac{\text{Total Wait Time}}{\sqrt{\text{Number of Cavitations}^3}} \quad (5)$$

$$\text{Error} = \sqrt{\text{Poisson Error}^2 + \text{System Error}^2} \quad (6)$$

TABLE 4

Baseline experiment results for Heptane with the Pu—Be neutron source at 35 cm.

| Negative pressure (bar) | Average time (s) between CDEs | CDEs within 60 s | Wait time error (s) |
|---|---|---|---|
| −4.4 | 97.24 | 14/30 | 25.99 |
| −4.6 | 42.71 | 21/30 | 9.33 |
| −4.8 | 17.42 | 29/30 | 3.25 |
| −5 | 5.00 | 30/30 | 0.96 |
| −5.2 | 3.35 | 30/30 | 0.68 |
| −5.4 | 2.42 | 30/30 | 0.53 |
| −5.6 | 1.52 | 30/30 | 0.41 |
| −5.8 | 1.21 | 28/28 | 0.38 |
| −6 | 1.04 | 10/10 | 0.44 |

By comparing the CDE rate per source neutron emission obtained experimentally to the cumulative recoil generation rate below a given energy per neutron emission given by the MCNP simulation, it was possible to determine the particular energy whereby the two generation rates are equal. This energy is thus determined to be the CDE detection recoil energy threshold (Eth). Depositions of energy onto a carbon atom exceeding Eth will be expected to cause a CDE, and consequently, depositions of energy onto a C atom of less than this amount will not cause a CDE.

Figure 6:
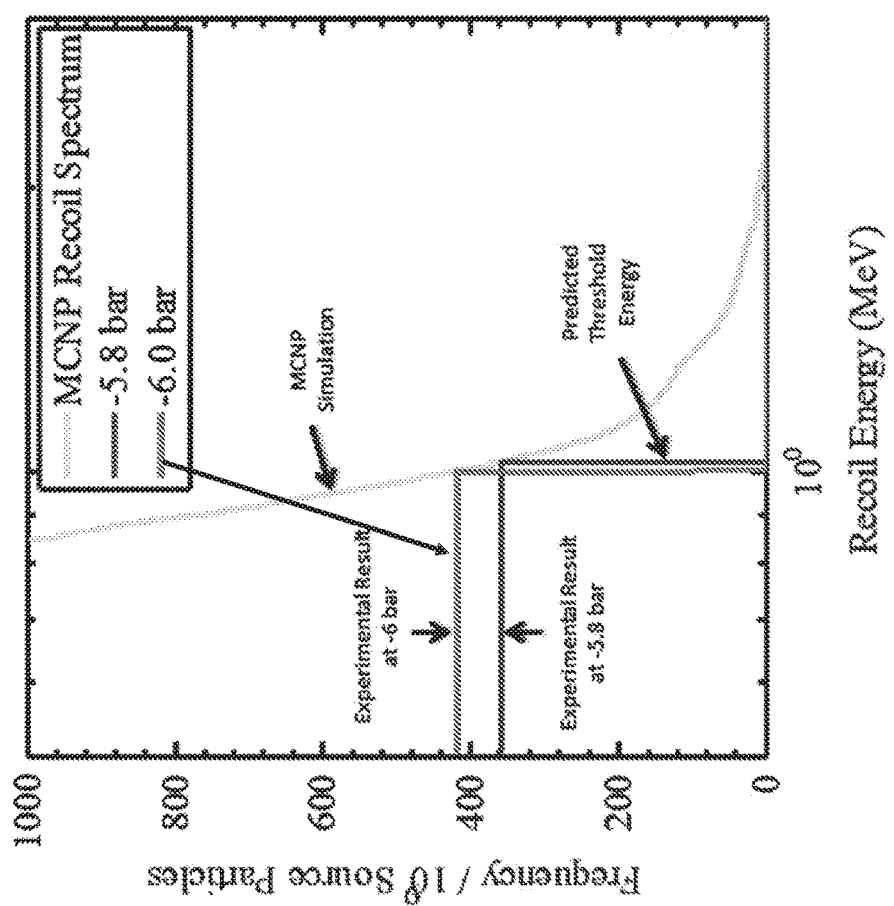
FIG. 6 shows MCNP predicted recoil spectrum in comparison with experimental neutron detection rates at various $|P_{neg}|$ states corresponding to recoil energy for nucleation.

Referring to FIG. 6, MCNP predicted recoil spectrum in comparison with experimental neutron detection rates at various $|P_{neg}|$ states corresponding to recoil energy for nucleation is provided. FIG. 6 graphically illustrates the process of Eth determination. The 'Recoil Spectrum' line depicts the MCNP calculated C recoil spectrum generated in the sensitive bulb region of the CTMFD per $10^9$ particles emitted from a Pu—Be source placed in a location corresponding to the geometry of the experiment shown in FIG. 4. The $|P_{neg}|=$'6.0 bar' line has a height corresponding to the number of particles detected experimentally in the test at −6 bar per $10^9$ particles emitted from the source (i.e., 1 CDE every 1.04 s as provided in Table 4). At the energy that the event frequency is the same for the '6.0 bar' and 'Recoil Spectrum' lines, the '6.0 bar' line is drawn straight downward and the energy corresponding to the detection threshold for C recoils with a Pu—Be source at 6 bar is encountered. The '5.8 bar' line represents the same process done in order to determine the threshold at $|P_{neg}|=5.8$ bar.

Figure 7:
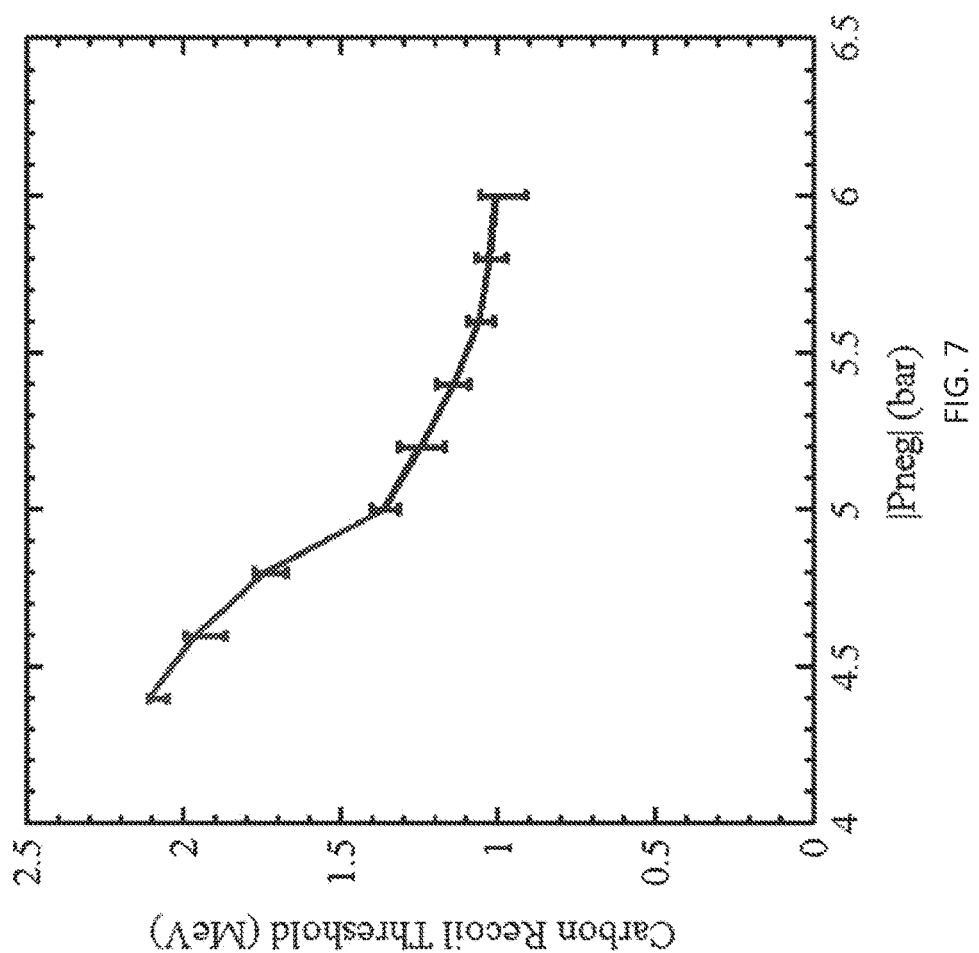
FIG. 7 shows variations of carbon recoil induced energy threshold for a CDE to occur versus the corresponding centerline $|P_{neg}|$.

Referring to FIG. 7, a graph of carbon recoil threshold in MeV vs. $|P_{neg}|$ in bars is provided showing variations of carbon recoil induced energy threshold for a CDE to occur vs the corresponding centerline $|P_{neg}|$. If the process is repeated for each of the experimental pressures, the full relationship between the negative pressure and the threshold energy can be obtained as is displayed in FIG. 7.

Figure 8:
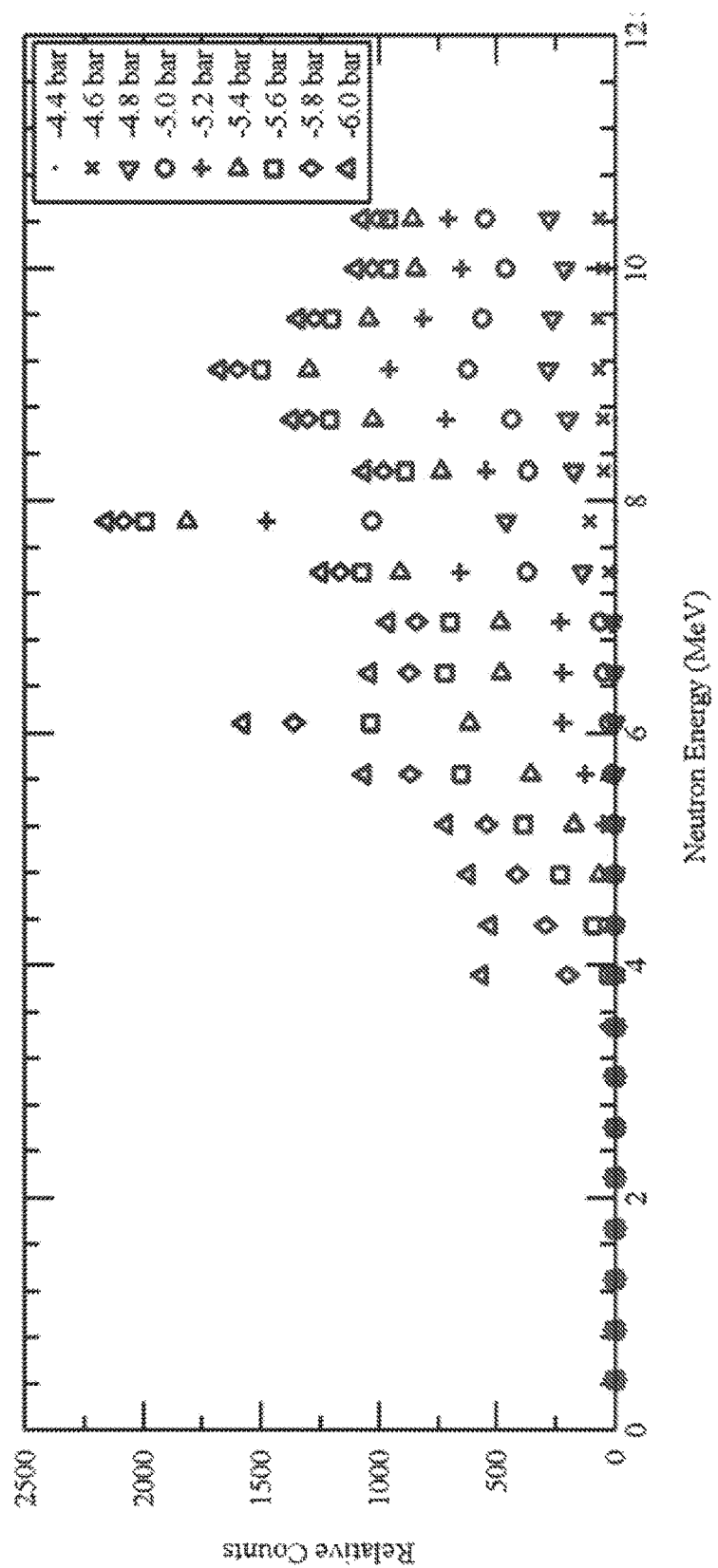
FIG. 8 shows a relative count graph of neutron energy for a response matrix of the CTMFD system, relating detection rates for neutrons of various energies.

For each of 24 arithmetically distributed incident neutron energies between 0.4 MeV and 10.4 MeV an MCNP simulation model was constructed with a source centered at that given energy but slightly distributed to minimize the effect of neutron scattering cross-section resonance and placed in the location of the PuBe source in the experiments. For every strike on a Carbon atom in the simulation, the energy imparted was compared to the response curve generated as discussed above. The radial position of the strike was used to determine the localized (off-centerline if need be) $P_{neg}$ in the CTMFD. Referring to FIG. 8, a relative count graph of neutron energy in MeV is provided in which a response matrix of the CTMFD system (FIG. 4)—relating detection rates for neutrons of various energies with $|P_{neg}|$ states varying from 4.4 bar to 6.0 bar. Thereafter, by repeating the above-mentioned process for each neutron energy and each of the centerline negative pressure states of the system, the full response matrix for the detector was derived as shown in FIG. 8. Depicted therein is the probability for a detection event to take place if a neutron is emitted at the experimental location with the energy on the x-axis and the CTMFD bulb with centerline negative pressure corresponding to the symbol in the legend. Because the maximum negative pressure of −6 bar was limited by the measurable wait times in the chosen detector-source geometry, the minimum encountered recoil threshold for this set of experiments was 1.0062 MeV as seen in FIG. 7. As a result, there was no possibility for detecting at neutron energies about 3.5 MeV. This is because neutrons are able to deposit via elastic scattering at most 28.4% of their energy onto C atoms.

Figure 9:
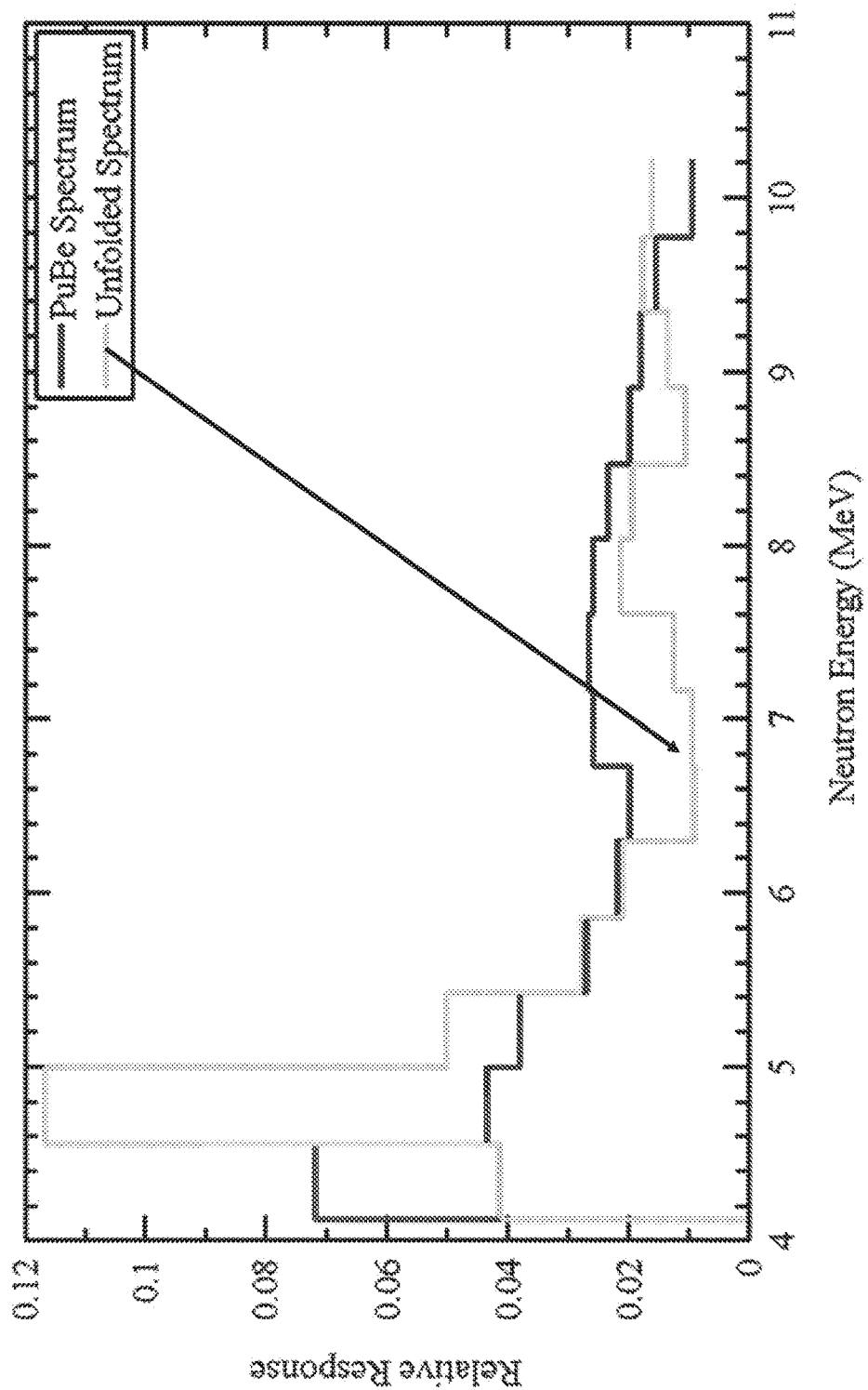
FIG. 9 shows relative response versus neutron energy for PuBe neutron source spectrum and unfolded approximation using volume averaged model of CTMFD detection volume.
Figure 10:
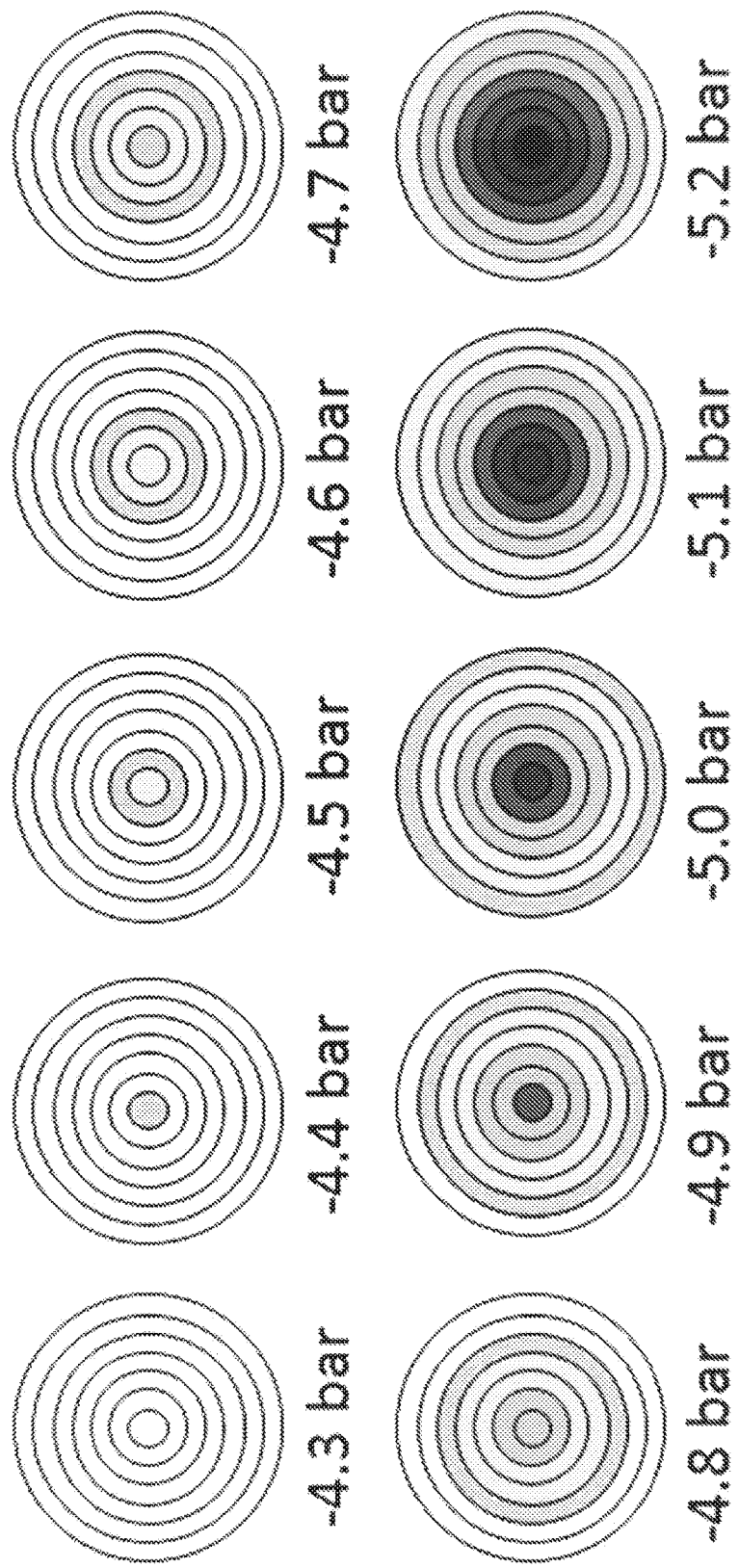
FIG. 10 shows the sensitivity regions in the detector bulb volume as the CTMFD rotates more rapidly.

Referring to FIG. 9, a graph of relative response vs. neutron energy (in MeV) is provided showing PuBe neutron source spectrum and unfolded approximation using volume averaged model of CTMFD detection volume. Using the response of the CTMFD to the Pu—Be spectrum from the experiment described above, it was possible to use the volume averaged response matrix discussed above and the unfolding code, BON, to reconstruct the spectrum of the original source as shown in FIG. 9. As explained earlier, because of the equipment constraints on wait time and the experimental geometry, neutron energy bins at and below about 3.5 MeV weren't possible to consider—by optimizing the source-detector geometry and increasing the source-to-detector distance it should be feasible to probe for lower energies but this was not done for the work reported herein. It is noted that the Pu—Be neutron spectrum over the valid energy domain of the response matrix of FIG. 8 is reasonably well captured from about 5 MeV to above 10 MeV. Instead of assuming that the entire CTMFD central volume is at the same negative pressure as at the centerline, it is also possible to think of the central bulb (holding the sensitized fluid for CDEs) as being composed as concentric cylinders with radii chosen such that the pressure gradient over the cylinder allows for a constant decrease in negative pressure from the inside edge to the outside edge. Then, the sensitivity of the cylinders with the same inside edge pressure but different experimental parameters can be solved for simultaneously. FIG. 10 depicts the sensitivity regions in the detector bulb volume as the CTMFD rotates more rapidly and engenders a progressively more tensioned pressure state at the centerline. In FIG. 10, all regions of the same color would now possess the same sensitivity for neutron detection. The sensitivity of the outer colored cylindrical zones of the first diagram is nil; with increasing rotational speed, the sensitized zone branches outwards with the inner ones being more sensitive and so on. After generating carbon recoil curves for each of the concentric cylinders in the bulb volume for each of the centerline negative pressures, all of the cylinders with the same inside line negative pressure were solved simultaneously by minimizing the difference between the number of events above the various thresholds for cylinders in the same experiment and the experimental wait time of that experiment. Two methods were: a modified Newton's method, and, an Integer program implemented through OPENSOLVER. In the modified Newton's method, we define x to express the energy thresholds for each of the groups of cylinders with the same sensitivity. F(x) expresses the difference between the number of simulated events above the various thresholds in the sensitivity cylinders summed across each simulated experiment and the experimentally determined number of events. J(x) expresses the change in the expected counts for each experiment induced by a unit change in the threshold for each of the groups of cylinders with the same sensitivity. As with any version of Newton's method.

$$v^{(n)} = -[J(x^{(n)})]^{-1} F(x^{(n)}) \quad (7)$$

and $$x^{(n+1)} = x^{(n)} + v^{(n)} \quad (8)$$

Because of the shape of the function it became necessary to constrain the step size. This was achieved by either constraining the length of the vector, v, or by constraining the magnitude of the elements of the vector. In this manner, solutions starting with $x^{(0)}=1$ MeV for all cylinder groups matured into acceptable threshold solutions. In using the Integer program method, first, all of the recoil curves were fitted to by a set of linear splines. The linear program was then programmed to choose thresholds such that the sum of the values on the splined approximation of the sensitivity cylinder recoil curves most closely matched the experimentally encountered count rate. As is known, the Integer program method is guaranteed to converge to a "globally" optimal solution, whereas the Newton's method solution is not guaranteed to offer such promise (the tradeoff being that the splines are approximations of the true recoil functions for the cylinders which are used directly by Newton's Method). Additionally, it is much easier to constrain the solution space to realizable solutions using an Integer program than it is with Newton's method.

In relation to the recoil curve shown in FIG. 7, all the experiments were required to use the same source in the same location in order to avoid the difficulties of having to combine experiments with the same threshold but with widely different count rates. However, this resulted in a constraint for using data with CDE wait times that were very long, and consequently having large Poisson errors, and also CDE wait times that were very short—thus, introducing large errors due to uncertainty in the CDE detection and event timing space. In order to be able to combine disparate experiments, the count rate and the simulated recoil curves were first scaled by the inverse of the Poisson error in the experiment. In addition to using different locations, a 252 Cf source with intensity of about $7.9*10^4$ was used in some of the experiments. Another refinement included using a CTMFD with a larger, 40 cc, sensitive volume for some of the experiments to enable the use of more cylinders each with various specific detection thresholds simultaneously. The experiment type combinations with assigned specific numbers, are tabulated in Table 5 and the resulting experimental data set and results are summarized in Table 6.

Figure 11:
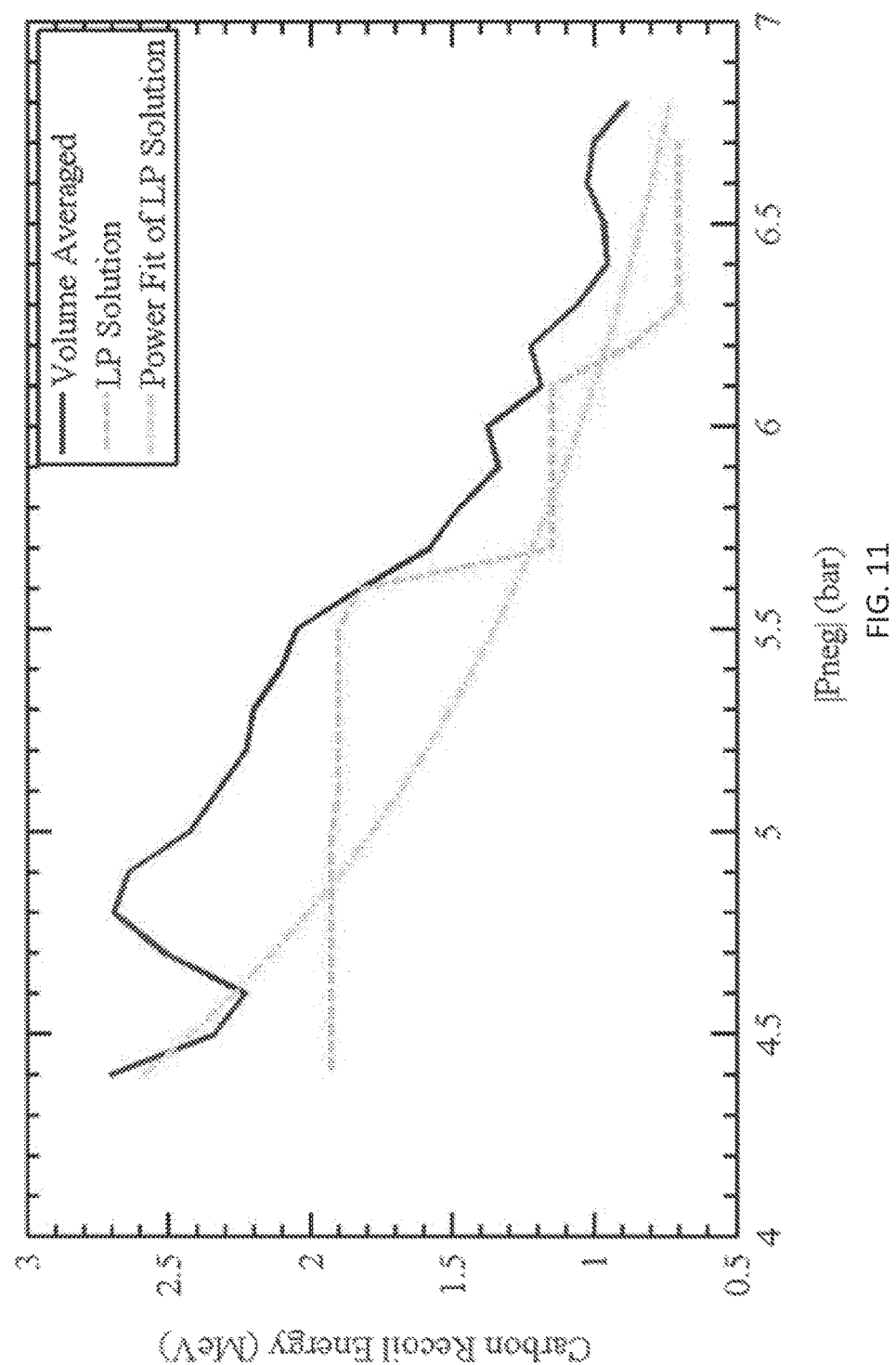
FIG. 11 shows carbon recoil energy versus $|P_{neg}|$ for volume averaged and LP integer program models.

An experiment was selected to become the 'unknown' data set so that the spectrum of the Cf source neutrons used to create it could be solved for. Using the other 8 experiments, a recoil threshold curve was constructed just as in FIG. 7. Referring to FIG. 11, a graph of carbon recoil energy vs. $|P_{neg}|$ in bar is provided showing variations of C recoil threshold energy with $|P_{neg}|$ for volume averaged and LP integer program models. Three solutions appear in FIG. 11. The 'Volume Averaged' solution corresponds to the thresholds obtained by using the volume averaged approach discussed above. The 'Integer Program' solution is the curve obtained by the integer program solution using the radial method discussed above. The 'Power Fit' solution represents a power law fit of the integer program solution. Power Fit was selected based on striving for resemblance to the form expected by the well-known Thermal Spike Theory used for bubble chambers (but, as explained earlier failed for TMFDs). The equation for the 'Power Fit' was derived as:

$$\text{Carbon Recoil Energy} = 189.71 * P_{neg}^{-2.9} \qquad (9)$$

Figure 12:
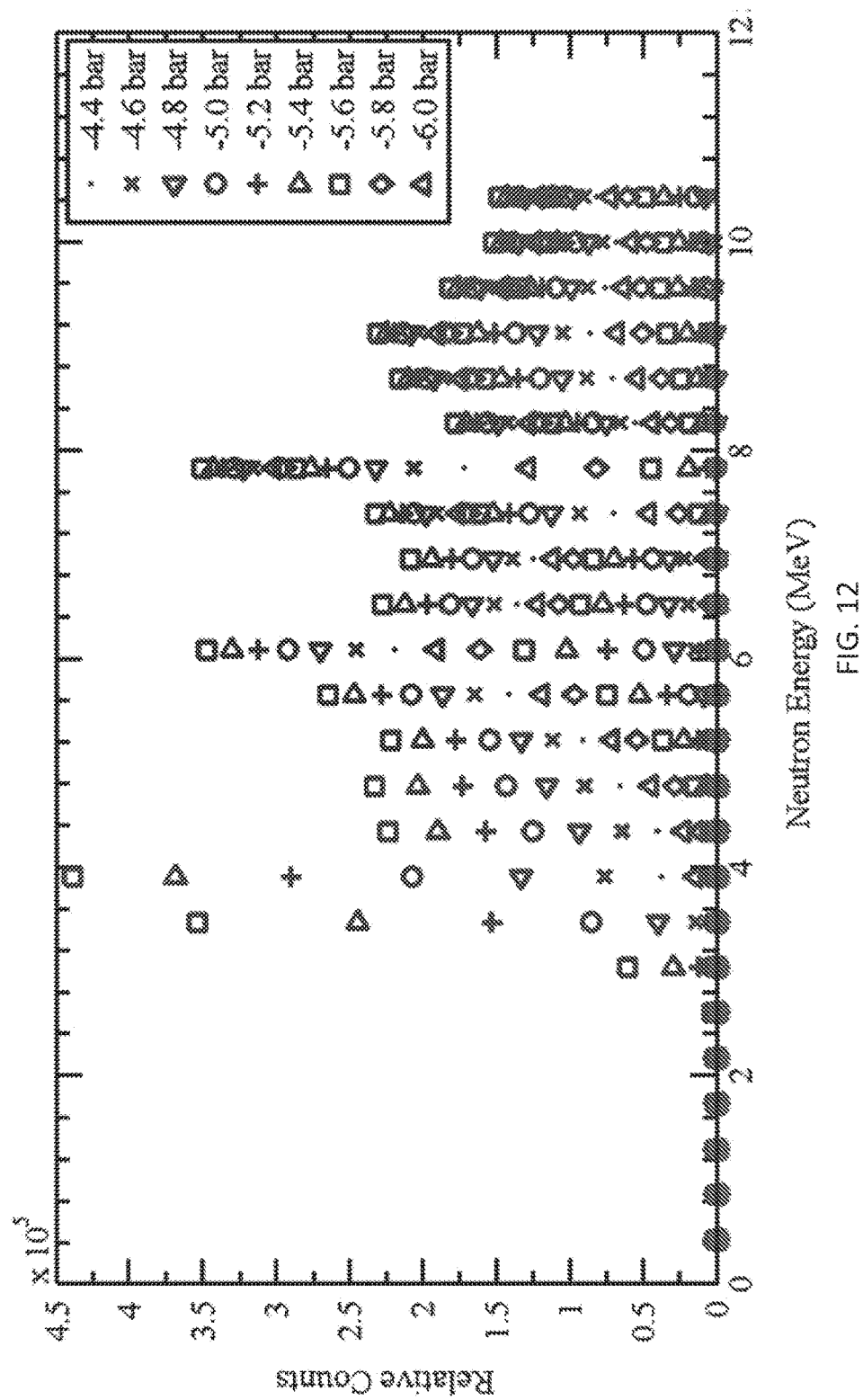
FIG. 12 shows relative count of neutron energy for a response matrix corresponding to the power law lift of FIG. 11.
Figure 13:
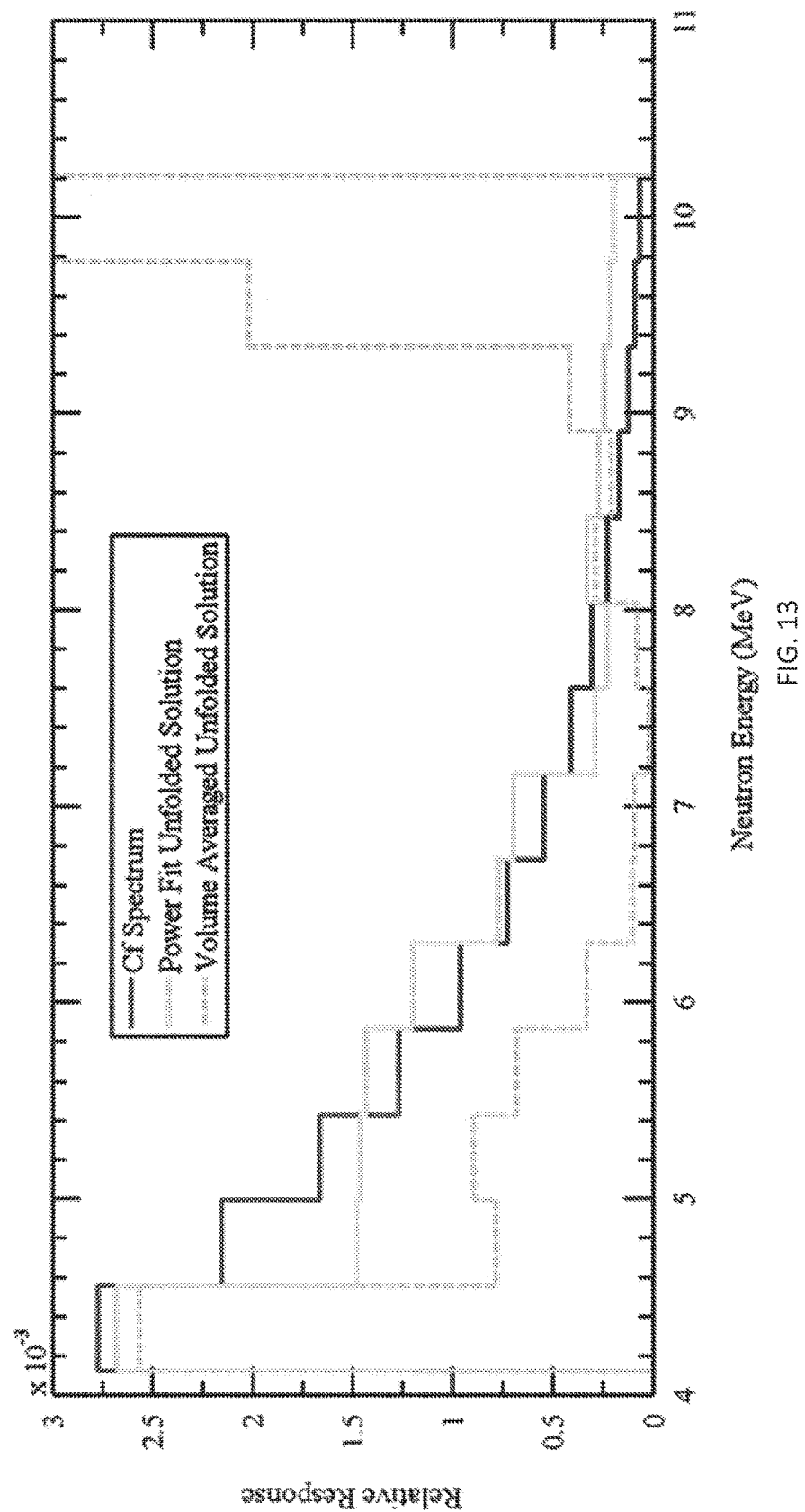
FIG. 13 shows relative response of neutron energy for Cf-252 neutron source spectrum and corresponding unfolded approximation.

Just as was done in the construction of FIG. 8, a series of monoenergetic neutrons were simulated originating from the unknown source location (in this case corresponding to the geometry of the experiment discussed above from Table 3). Events simulated in MCNPX-POLIMI to create carbon recoils with more energy than the threshold established by the power fit solution of FIG. 11 were deemed to create a CDE. Referring to FIG. 12, relative counts of neutron energy in MeV is provided showing resulting response matrix corresponding to the power law lift of FIG. 11. Simulations with each centerline negative pressure at each of the monoenergetic energies formed the response matrix shown in FIG. 12. Finally, by using the experimental data from Experiment 2 and the response matrix of FIG. 12 it was possible to use the BON unfolding code to produce the unfolded spectrum as shown in FIG. 13, wherein relative responses of neutron energy in MeV is presented where Cf-252 neutron source spectrum and the corresponding unfolded approximation (using experimental data from Table 6 together with the response matrix of FIG. 12) are provided. This was also performed for the volume averaged method described earlier using the same experiments to form a similar response matrix and unfolded spectrum. As expected, the unfolding performed using the radial method discussed above significantly outperformed the volume averaged method described above. The large radial component of the experiments with the 40 cc bulbs resulted in the importance of strike location being non-negligible. As a result, the volume averaged solution predicted thresholds that were higher than the true thresholds. Thus, it would appear that the radial method will be required for real world spectroscopy application with large volume CTMFDs.

Experiments were separately conducted with known monoenergetic neutrons in order to independently validate the predictive capability of the as-derived carbon recoil based response curves derived from isotopic neutron sources. This included experiments using a D-T generator producing 14.1 MeV neutrons at an intensity of about $1.3*10^7$ n/s, and experiments using a D-D neutron generator producing 2.45 MeV neutrons at an intensity of about $2.6*10^7$ n/s. The $P_{neg}$ tension pressure states corresponding to the maximum wait time for a CDE distinctly distinguishable from background was determined to be "4.1 bar (for 14 MeV neutrons), and "7.3 bar (for 2.45 MeV neutrons), respectively. A MCNPX-POLIMI simulation was constructed to obtain the recoil spectrum such that it could be matched to the experimental count rate as was done earlier. Assuming the entire bulb had equal sensitivity to the high energy neutrons, the calculated corresponding C recoil energy thresholds were about 4.0 MeV and 0.7 MeV, respectively for incident 14 MeV and 2.45 MeV neutrons (given that 4.0=about 14.1*0.284 and 0.7=about 2.45*0.284). The multiplier 0.284 is derived from elastic scattering of neutron with a C atom [i.e., $0.284=1-(A-1)^2/(A+1)^2$, where A=12 for C]. Assuming instead that all counts originated within 0.1 cm of the centerline, using the simulation, the implied threshold for the 14 MeV neutron scatters reduced to about 3.42 MeV while the threshold for 2.45 MeV neutrons remained virtually the same at about 0.70 MeV. Using the Power Fit described herein, the thresholds expected at −4.1 and −7.3 bar respectively were 3.171 and 595 MeV (quite close to the experimental values of ~3.2 and 0.7 MeV), providing added evidence for applicability of SAS over the 2.45 MeV to 14 MeV neutron energy range.

Figure 14:
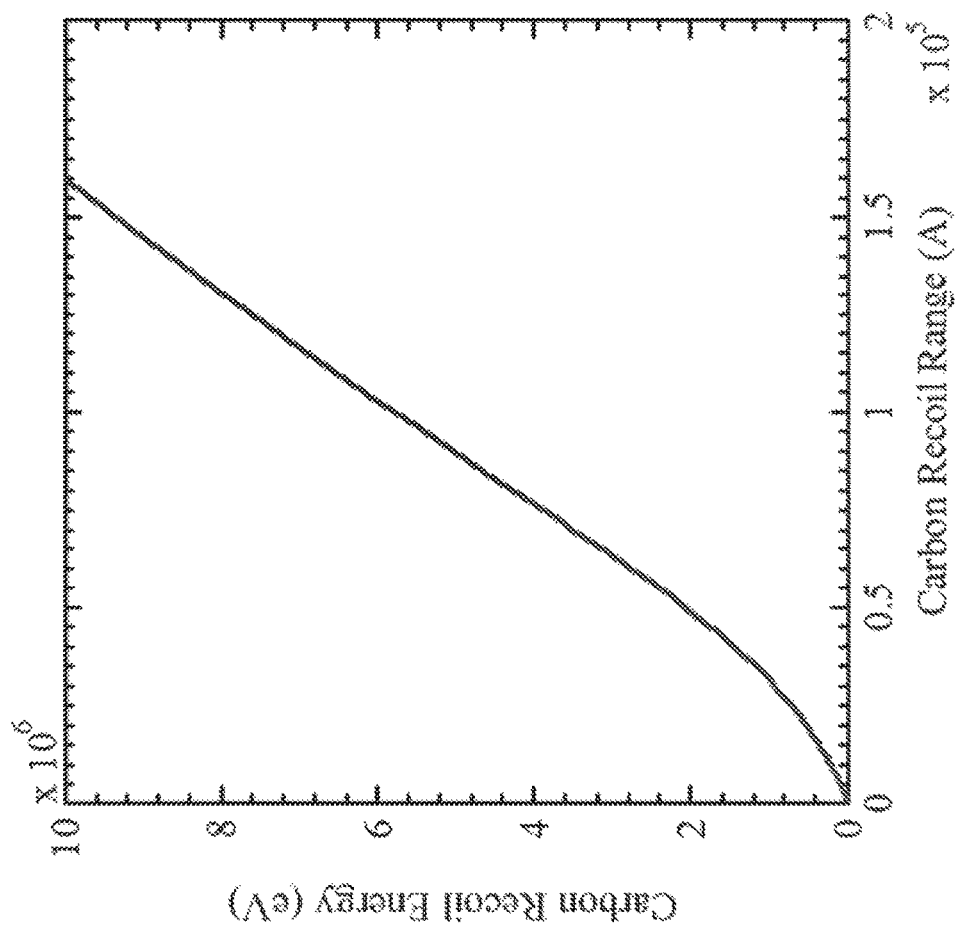
FIG. 14 shows carbon recoil energy versus carbon recoil range for a calculated carbon recoil range curve in heptane.
Figure 15:
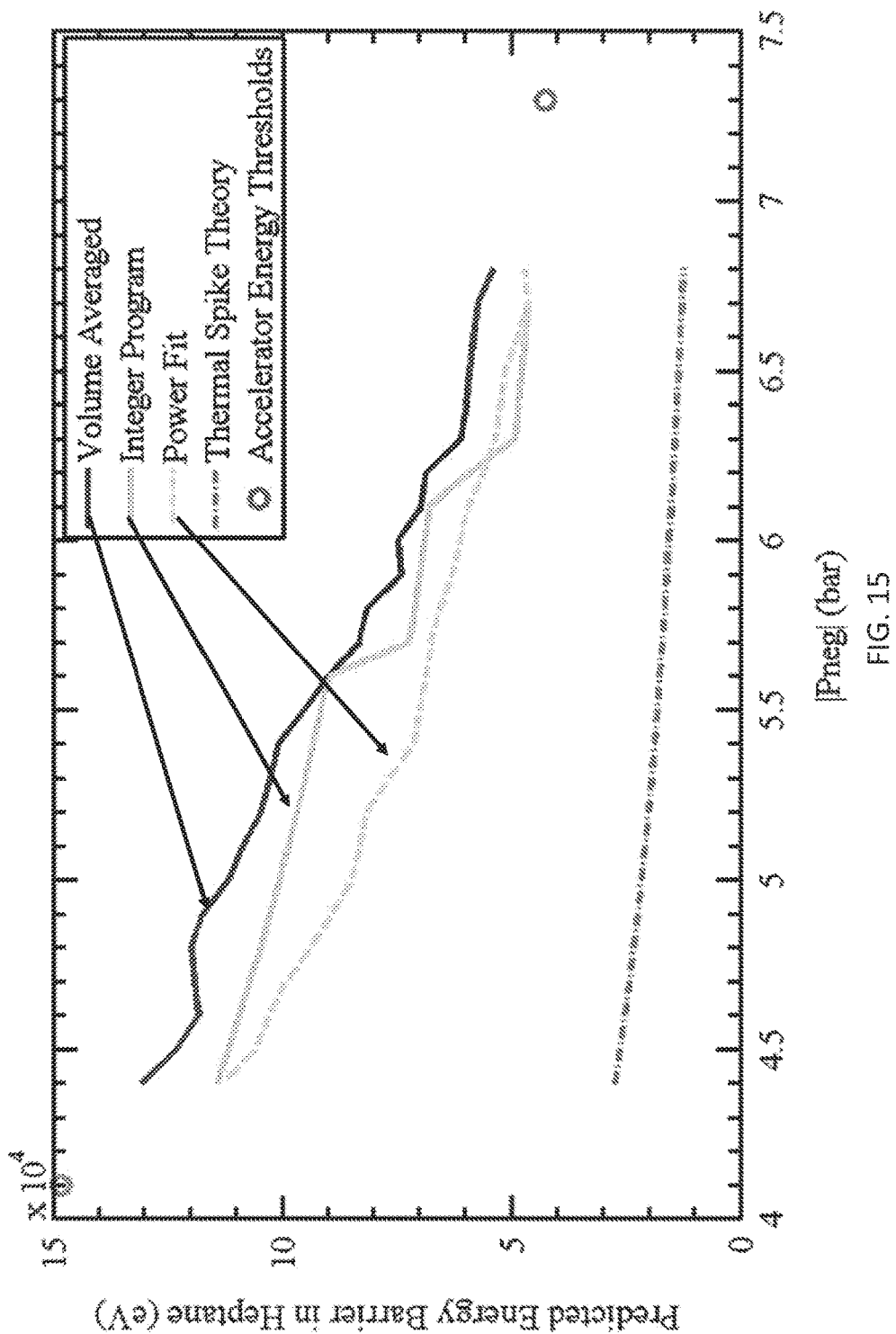
FIG. 15 shows predicted energy barrier in heptane versus $|P_{neg}|$, comparing predicted required energy thresholds for CDEs from neutron induced C recoils versus $|P_{neg}|$ for various techniques with predictions from Thermal Spike Theory.

Referring to FIG. 14 a graph of carbon recoil energy (eV) vs. carbon recoil range (A) is presented where calculated carbon recoil range curve in heptane is provided. Using SRIM, the relationship between the energy of an energetic C ion and the LET as that ion traverses the Heptane was derived. This information is presented in FIG. 14. Using this relationship, it was possible to transition from describing the amount of energy required to be delivered to the C atoms in order to cause CDEs, to now assessing for the amount of energy that needs to be deposited within a critical radius (in the TMFD fluid—heptane), in order to cause CDEs. Thus, enabling the results from the recoil threshold curves to be compared to predictions for CDE onset predicted by the classical TST we have discussed earlier. The experimentally obtained thresholds from mono-energetic (2.45 MeV and 14 MeV) neutrons are included in FIG. 15 and, de facto act as anchors at the lower and upper bounds in the $P_{neg}$ range. Referring to FIG. 15, predicted energy barrier in heptane (measured in eV) vs. $|P_{neg}|$ in bar is presented, where predicted required energy thresholds for CDEs from neutron induced C recoils vs $|P_{neg}|$ for various techniques compared with predictions from Thermal Spike Theory are provided—included are estimates from experiments with DD (2.45 MeV) and DT (14 MeV) accelerator neutron sources. From the results plotted in FIG. 15, it is obvious that the predicted results from our recoil curves enable a reasonably accurate capability for fast neutron spectroscopy over the 2.5 MeV to 14 MeV range; in sharp contrast to the vast under-predictions from the Thermal Spike Theory (TST) widely used for predicting energy thresholds in classical bubble chambers and superheated droplet detectors.

The following protocol can be used for obtaining spectroscopy in other fluids besides heptane.
1. Acquire CDE data with several source-detector geometries across all wait times where the count rate is distinguishable from background and small enough to be measured, 2. Model those geometries in MCNPX-POLIMI and determine the recoil spectrum, 3. Use volume averaged and/or radial methods to establish the recoil curve, 4. Simulate mono-energetic sources in the source-detector geometry to be used in the problem and use the recoil curve to determine then number of nucleation events to form the response matrix, 5. Take data with the unknown source, 6. Feed the response matrix and the experimental data from the unknown source into the BON unfolding code, and finally utilize the as-coded SAS computer code "Output", and 7. Computer program Output displays results of the unfolded spectrum of the unknown neutron source.

For fluids where the recoil curve has already been established steps 1-3 can be skipped. For fluids with known response curves and geometries with already developed response matrices, steps 1-4 can be skipped. Because steps 1-4 are all performed ahead of time and steps 6-7 can be performed in less than 1 s, the amount of time required to get spectroscopic information depends on the time it takes for data acquisition. The 'experiment 2' data set used for unfolding in this paper included 428 CDEs with an average time to detection of 27.8 s across 16 negative pressures for a total of 3.3 h of sensitive time. Using larger numbers of detectors and fewer negative pressures it should be possible to substantially reduce the time to spectrum to meet current Department of Homeland Security needs of less than 20 s per interrogation.

Figure 16:
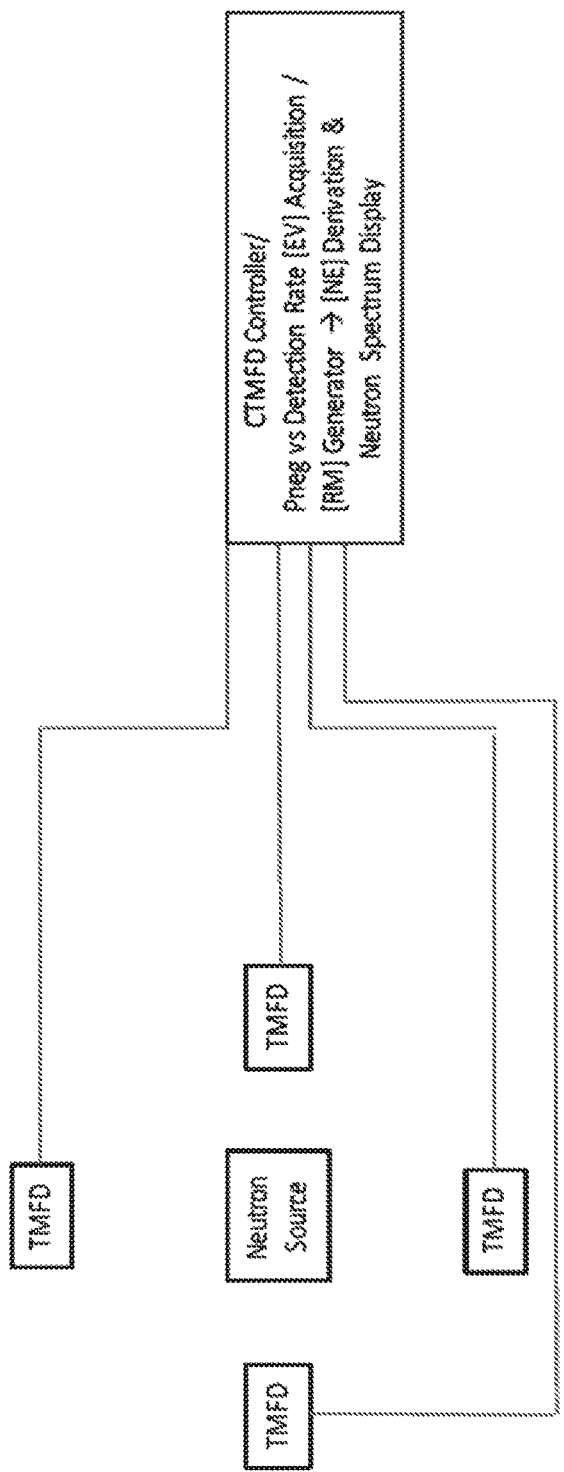
FIG. 16 is a schematic diagram for a system comprising detectors for solving a vector matrix equation relating to relative detection time for a range of $P_{neg}$ states.

Referring to FIG. 16, a schematic diagram for a system comprising one or more detectors for solving [EV]=[RM]×

[NE], where EV is a vector matrix of results of relative detection time for a range of $P_{neg}$ states obtained experimentally by the placement of one or more detectors equidistance from an unknown neutron source, NE is a neutron energy vector, RM is a response matrix, and $P_{neg}$ is the tensioned negative pressure.

Figure 17A:
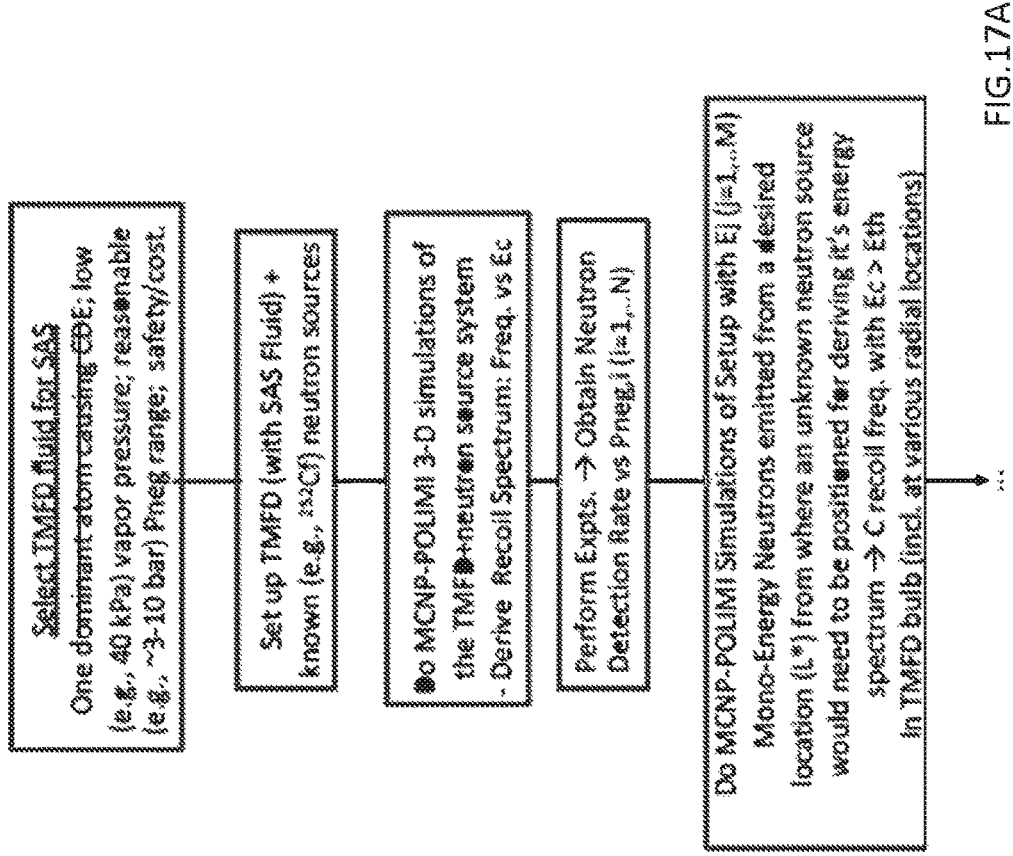
Figure 17B:
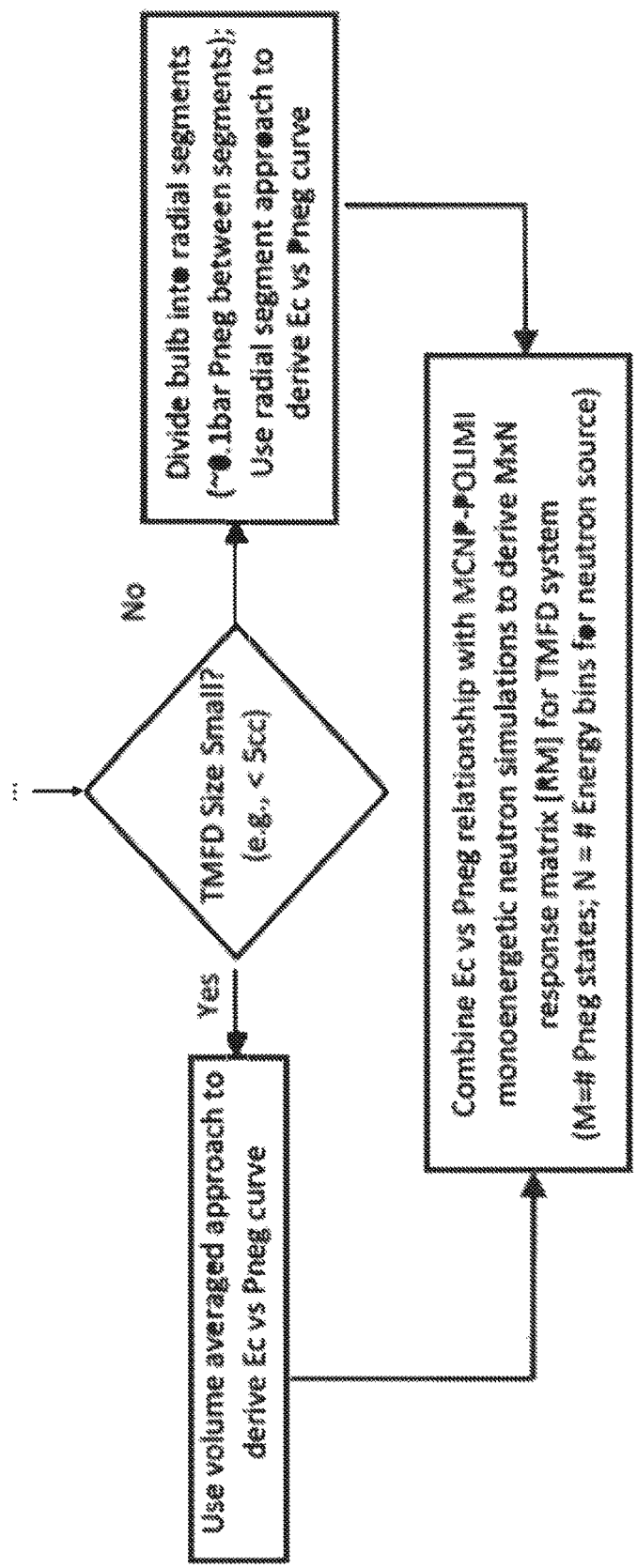

Referring to FIG. 17A, FIG. 17B, and FIG. 17C, a flowchart outlining operations embodied in the present disclosure are provided spanning three pages for deriving the response matrix.

The following references are related to the present disclosure, entirety of each of which is incorporated herein by reference into the present disclosure.

Those skilled in the art will recognize that numerous modifications can be made to the specific implementations described above. The implementations should not be limited to the particular limitations described. Other implementations may be possible.

REFERENCES

[1] Rusi Taleyarkhan, J. Lapinskas, Y. Xu, Tensioned metastable fluids and nanoscale interactions with external stimuli-Theoretical-cum-experimental assessments and nuclear engineering applications, Nucl. Eng. Des. 238 (7) (2008) 1820-1827.

[2] T. F. Grimes, J. A. Webster, B. A. Archambault, R. P. Taleyarkhan. Applications of Tension Metastable Fluid Detectors in Active Neutron/Photon SNM Interrogation Systems, IEEE, HST Conference Transactions, Paper 46, 978-1-4799-1737-2/15, 2015.

[3] Frederick Seitz, On the theory of the bubble chamber, Phys. Fluids (1958-1988) 1 (1) (1958) 2-13.

[4] C. D. West, Cavitation Bubble Nucleation by Energetic Particles, Oak Ridge National Laboratory, Oak Ridge, Tenn., 1998, No. ORNL/TM-13683.

[5] T. F. Grimes, J. A. Webster, B. A. Archambault, R. P. Taleyarkhan. Applications of tension metastable fluid detectors in active neutron/photon SNM interrogation systems, Poster Session IEEE HST 2015 Conference, 2015.

[6] Glenn F. Knoll, Radiation Detection and Measurement, John Wiley & Sons, 2010.

[7] L. Briggs, A new method for measuring the limiting negative pressure in liquids, Science. 109 (1949) 440.

[8] James F. Ziegler, Matthias D. Ziegler, Jochen P. Biersack, SRIM—The stopping and range of ions in matter (2010), Nucl. Instrum. Methods Phys. Res. Sect. B: Beam Interact. Mater. Atoms 268 (11) (2010) 1818-1823.

[9] T. F. Grimes, et al. Gamma-blind transformational nuclear particle sensors, IEEE HST Conference Transactions, 978-1-4673-2709-1/12, 417-422, 2012.

[10] Sara A. Pozzi, Enrico Padovani, Marzio Marseguerra, MCNP-PoliMi: a Monte-Carlo code for correlation measurements, Nucl. Instruments Methods Phys. Res. Sect. A: Accel. Spectrom. Detect. Assoc. Equip. 513 (3) (2003) 550-558.

[11] R. S. Sanna, A Manual for BON: A Code for Unfolding Multisphere Spectrometer Neutron Measurements, EML-394, August 1981.

[12] Brian Bradie, A Friendly Introduction to Numerical Analysis, Pearson Prentice Hall, Upper Saddle River, N J, 2006.

[13] A. J. Mason, OpenSolver—an open source add-in to solve linear and integer progammes in excel, Operations Research Proceedings 2011, 2012. pp. 401-406.

[14] T. F. Grimes, Nucleation and Detection in Tensioned Metastable Fluids (Ph.D. dissertation), Purdue University, 2015.

[15] ANSI, American National Standard Performance Criteria for Spectroscopy-Based Portal Monitors Used for Homeland Security, Technical Report ANSI 42.35, American Nuclear Standards Institute, Washington, D.C., 2007.

The invention claimed is:

1. A portable system for detecting neutrons comprising a plurality of tensioned metastable fluid detectors (TMFDs), a neutron source, and a tensioned metastable fluid detector controller, wherein the portable system is configured to acquire a vector matrix [EV], generate a response matrix [RM], and derive a neutron energy vector [NE] based on [EV]=[RM]x[NE], wherein [EV] is a vector matrix of results of relative detection time for a range of $P_{neg}$ values obtained experimentally by placing said plurality of tensioned metastable fluid detectors (TMFDs) equidistance from an unknown neutron source, RM is a response matrix representing a probability matrix for detecting a fraction of neutrons of a certain energy from cavitation detection events, and $P_{neg}$ is the tensioned negative pressure.

2. The portable system of claim 1, wherein said TMFDs comprise a detection fluid capable of enabling neutron detection, wherein the neutron detection is caused when a neutron strikes against a single predominant atom in a molecule of the detection fluid.

3. The portable system of claim 1, wherein said detection fluid has a vapor pressure at or below 180 mmHg.

4. The portable system of claim 1, wherein said detection fluid comprises heptane.

5. A method of detecting neutrons with the portable system of claim 1, comprising:
providing a portable system comprising a plurality of tensioned metastable fluid detectors (TMFDs), a neutron source, and a tensioned metastable fluid detector controller;
using the portable system with a detection fluid enabling single atom spectroscopy (SAS) to acquire cavitation detection event data with a known neutron spectrum source of known intensity;
acquiring a vector matrix [EV] and generating a response matrix [RM]; and
generating neutron energy spectrum vector [NE] based on [NE]=[RM]$^{-1}$x[EV].

6. The method of claim 5, wherein the method further comprises a step of predicting a required $P_{neg}$ with an equation:

$$H_{vap}=0.1605*P_{neg}^2+0.6305*P_{neg}+260.036 \ (R^2=0.79)$$

wherein $H_{vap}$ is heat of vaporation.

* * * * *